(12) United States Patent
Lebeer et al.

(10) Patent No.: US 12,472,211 B2
(45) Date of Patent: Nov. 18, 2025

(54) DOLOSIGRANULUM PIGRUM STRAINS AND USES THEREOF

(71) Applicant: UNIVERSITEIT ANTWERPEN, Antwerp (BE)

(72) Inventors: Sarah Lebeer, Mortsel (BE); Jennifer Jörissen, Berchem (BE); Ilke De Boeck, Buggenhout (BE)

(73) Assignee: Universiteit Antwerpen, Antwerp (BE)

( * ) Notice: Subject to any disclaimer, the term of this patent is extended or adjusted under 35 U.S.C. 154(b) by 1041 days.

(21) Appl. No.: 17/416,692

(22) PCT Filed: Dec. 20, 2019

(86) PCT No.: PCT/EP2019/086763
§ 371 (c)(1),
(2) Date: Jun. 21, 2021

(87) PCT Pub. No.: WO2020/128022
PCT Pub. Date: Jun. 25, 2020

(65) Prior Publication Data
US 2022/0143104 A1  May 12, 2022

(30) Foreign Application Priority Data

Dec. 21, 2018  (EP) .................. 18215583

(51) Int. Cl.
*A61K 35/74* (2015.01)
*A61P 11/06* (2006.01)
*A61P 31/04* (2006.01)

(52) U.S. Cl.
CPC .............. *A61K 35/74* (2013.01); *A61P 11/06* (2018.01); *A61P 31/04* (2018.01)

(58) Field of Classification Search
CPC ......... A61K 35/74; A61K 35/66; A61P 11/06; A61P 31/04
See application file for complete search history.

(56) References Cited

FOREIGN PATENT DOCUMENTS

WO    WO-2015140299 A1 *  9/2015  ........... A61K 35/747
WO    2016172686 A1      10/2016

OTHER PUBLICATIONS

GenBank reference corresponding to accession No. X70907.1; deposited in the GenBank on Dec. 31, 1993 (Year: 1993).*
Laufer et al. "Microbial Communities of the Upper Respiratory Tract and Otitis Media in Children", mBio, 2011, vol. 2, Issue 1, article e00245-10, 7 pages (Year: 2011).*
NCBI Reference corresponding to RefSeq GCF_000245815.1, Genome Assembly Dolo_pigr_ATCC_51524_V1, the genome for Dolosigranulum pigrum ATCC 51524, deposited Feb. 7, 2012 (Year: 2012).*
De Boeck et al. "The nasal mutualist Dolosigranulum pigrum AMBR11 supports homeostasis via multiple mechanisms", iScience, 2021, vol. 24, Issue 9, article 102978, 23 pages (Year: 2021).*
Sharma et al. "Role of probiotics in the management of lung cancer and related diseases: An update", Journal of Functional Foods, 2018, vol. 40, pp. 625-633. Available online Dec. 22, 2017 (Year: 2018).*
Tapiovaara et al. "Probiotics and the Upper Respiratory Tract: A Review", Pediatric Infectious Disease, 2016, vol. 1, No. 3:19, 8 pages. (Year: 2016).*
Forsythe "Probiotics and Lung Diseases", Chest, 2011, vol. 139, Issue 4, pp. 901-908. (Year: 2011).*
Mortaz et al. "Probiotics in the management of Lung Diseases", Mediators of Inflammation, vol. 2013, Article ID 751068, 10 pages. (Year: 2013).*
Sikorska et al. "Role of probiotics in the prevention and treatment of methicillin-resistant *Staphylococcus aureus* infections", International Journal of Antimicrobial Agents, 2013, vol. 42, Issue 6, pp. 475-481. (Year: 2013).*
Van den Broek et al. "Multifactorial inhibition of lactobacilli against the respiratory tract pathogen Moraxella catarrhalis", Beneficial Microbes, 2018, vol. 9, Issue 3, pp. 429-439, epub available Apr. 10, 2018. (Year: 2018).*
Flores Ramos et al. "Genomic Stability and Genetic Defense Systems in Dolosigranulum pigrum, a Candidate Beneficial Bacterium from the Human Microbiome", mSystems, 2021, vol. 6, No. 5, article 6:e00425-21, 22 pages. (Year: 2021).*
International Search Report mailed Mar. 16, 2020 in reference to co-pending European Patent Application No. PCT/EP2019/086763 filed Dec. 20, 2019.
Afzal, et al., "Carnobacterium maltaromaticum: Identification, isolation tools, ecology and technological aspects in dairy products", Food Microbiology, ScienceDirect, vol. 27, pp. 573-579, 2010.

(Continued)

*Primary Examiner* — Melenie L Gordon
*Assistant Examiner* — Deepa Mishra
(74) *Attorney, Agent, or Firm* — FRESH IP PLC; Michael H. Anderson

(57) ABSTRACT

The present invention relates to novel isolated bacterial strains of the *Dolosigranulum pigrum* species and variants thereof having at least 99% sequence identity in its 16S rRNA gene to said novel strains. The present invention further relates to the use of these bacterial strains, and compositions comprising said strains for use as a probiotic, such as for improving or restoring the flora/microbiota of the respiratory tract and skin. The present invention further relates to the use of these bacterial strains as an antibacterial agent; for use in human or veterinary medicine; for use in the treatment of human or veterinary diseases; or for use in personal hygiene industry, food industry, cleaning industry, pharma industry, or biocontrol applications.

6 Claims, 14 Drawing Sheets
Specification includes a Sequence Listing.

(56) References Cited

OTHER PUBLICATIONS

Biesbroek, et al., "Early Respiratory Microbiota Composition Determines Bacterial Succession Patterns and Respiratory Health in Children", American Journal of Respiratory and Critical Care Medicine, Original Article, vol. 190, No. 11, pp. 1283-1292, Dec. 1, 2014.
Callahan, et al., "DADA2: High resolution sample inference from Illumina amplicon data", Natural Methods, vol. 13, No. 7, pp. 581-583, Jul. 2016.
Chalermwatanachai, et al., "Chronic rhinosinusitis with nasal polyps is characterized by dysbacteriosis of the hasal microbiota", Scientific Reports, vol. 8, pp. 1-12, 2018.
De Boeck, et al., "Comparing the Healthy Nose and Nasopharynx Microbiota Reveals Continuity as Well as Niche-Specificity", Frontiers in Microbiology, vol. 8, Article 2372, pp. 1-11, Nov. 2017.
De Boeck, et al., "Anterior Nares Diversity and Pathobionts Represent Sinus Microbiome in Chronic Rhinosinusitis", American Society for Microbiology, vol. 4, Issue 6, pp. 1-15, Nov./Dec. 2019.
Koeller, et al., "Microbiome and Culture Based Analysis of Chronic Rhinosinusitis Compared to Healthy Sinus Mucosa", Frontiers in Microbiology, vol. 9, Article 643, pp. 1-12, Apr. 2018.
Laufer, et al., Microbial Communities of the Upper Respiratory Tract and Otitis Media for Children, MBIO, Research Article, vol. 2, Issue 1, pp. 1-7, Jan./Feb. 2011.
Lebeer, et al., "Functional Analysis of Lactobacillus rhamnosus GG Pili in Relation to Adhesion and Immunomodulatory Interactions with Intestinal Epithelial Cells", Applied and Environmental Microbiology, pp. 185-196, 2012.
Mahdavinia, et al., "The nasal microbiome in patients with chronic rhinosinusitis: Analyzing the effects of atopy and bacterial functional pathways in 111 patients", J. Allergy Clin. Immunol. vol. 142, No. 1, pp. 287-290, Jul. 2018.
Pasolli, et al., "Accessible, curated metagenomic data through ExperimentHub", Nature Methods, vol. 14, No. 11, pp. 1023-1024, Oct. 31, 2017.
Ramakrishnan, et al., "Sinus microbiota varies among chronic rhinosinusitis phenotypes and predicts surgical outcome", J. Allergy Cli. Immunol., vol. 136, No. 2, pp. 334-342, 2015.
Van Den Broek, et al., "Multifactorial inhibition of lactobacilli against the respiratory tract pathogen Moraxella catarrhalis", Beneficial Microbes, vol. 9, No. 3, pp. 4229-4439, 2018.
Vandeputte, et al., "QUantitative microbiome profiling links gut community variation to microbial load", Nature, Letter, vol. 551, pp. 507-528, Nov. 23, 2017.

* cited by examiner

FIG. 5 - CONTINUED
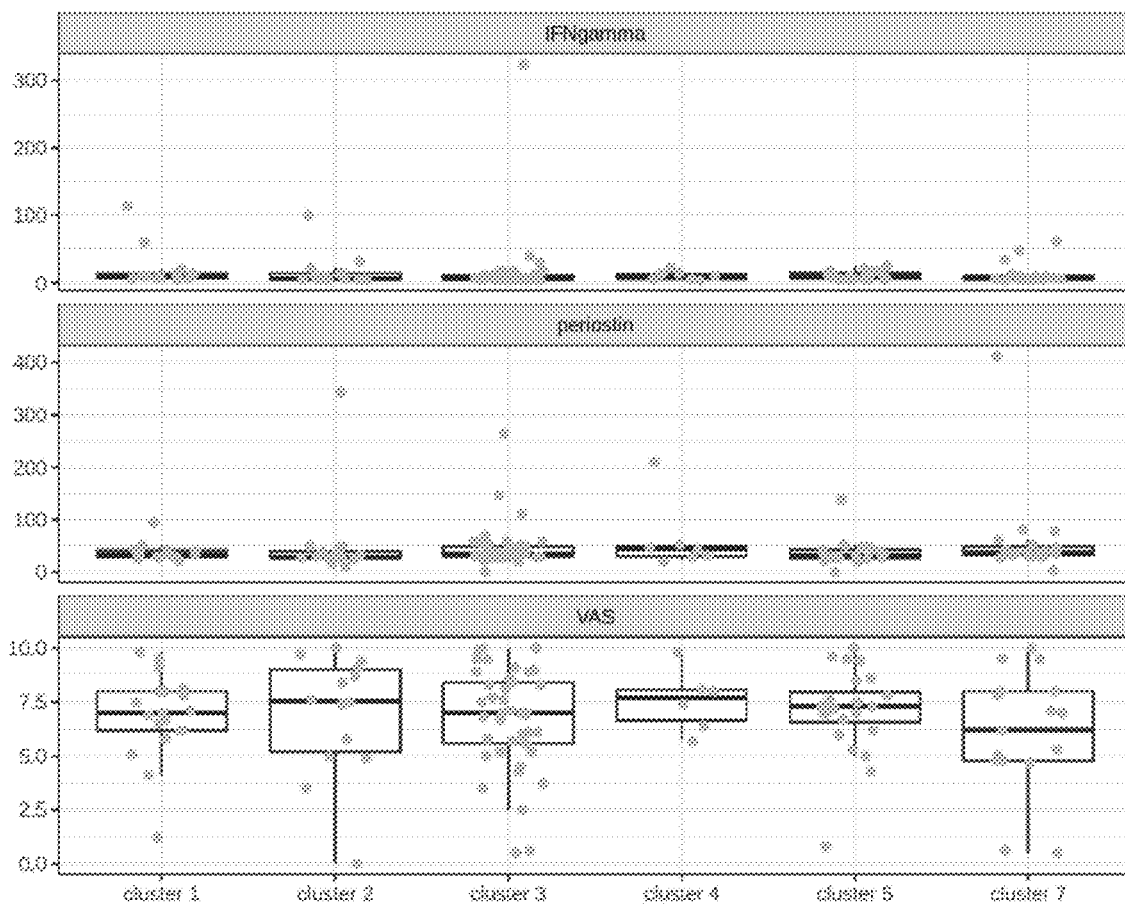
FIG. 6A
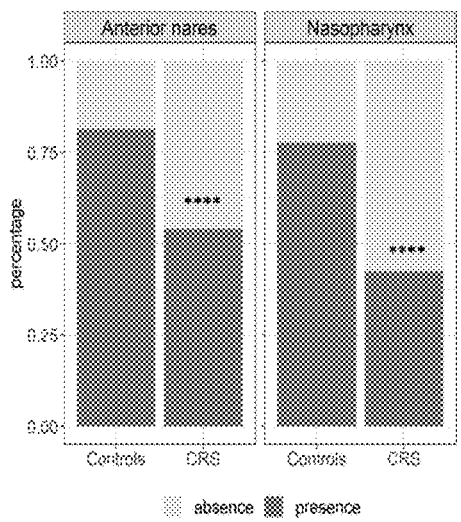
FIG. 6B
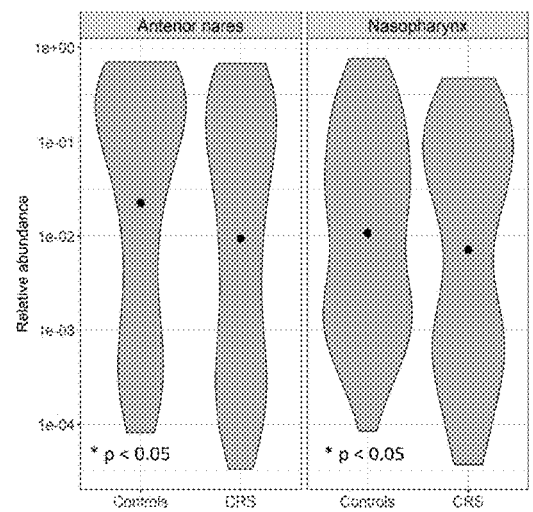

- S. aureus
- D. pigrum AMBR11
- L. rhamnosus GG
- L. casei AMBR2
- BHI + 0,5% Tween
- MRS pH 4,3
- D. pigrum LMG15126

- L-lactic acid
- D-lactic acid

\* significance against cells

\* significance against *S. aureus*

FIG. 14

ATGAGAGTTTGATCTTGGCTCAGGACGAACGCTGGCGGCATGCCTAATACATGCAAGTCGAACG
ATGATATCACTGCTTGCAGTGATTGATTAGTGGCGAACGGGTGAGTAACACGTGAGGAACTTGC
CCATGAGCGGGGGACAACATTCGGAAACGGATGCTAATACCCCATAGGTGGATTGGTCGCATG
ACGAATTCATTAAAGGTGGCTTTGCTACCACTCATGGATAGCCTCGCGGCGTATTAGCTAGTTG
GTAAGGTAATGGCTTACCAAGGCAGTGATACGTAGCCGACTTGAGAGGGTGATCGGCCACACT
GGGACTGAGACACGGCCCAGACTCCTACGGGAGGCAGCAGTAGGGAATCTTCCACAATGGGT
GCAAACCTGATGGAGCAATGCCGCGTGAGTGAAGAAGGTCTTCGGATCGTAAAGCTCTGTTGTT
AGAGAAGAACACGTGCTAGGTAACTACTAGCGCCTTGACGGTATCTAACCAGAAAGTCACGGCT
AACTACGTGCCAGCAGCCGCGGTAATACGTAGGTGACAAGCGTTGTCCGGATTTATTGGGCGT
AAAGGGAGCGCAGGCGGTCTGTTTAGTCTAATGTGAAAGCCCACGGCTTAACCGTGGAACGGC
ATTGGAAACTGACAGACTTGAATGTAGAAGAGGAAAATGGAATTCCAAGTGTAGCGGTGGAATG
CGTAGATATTTGGAGGAACACCAGTGGCGAAGGCGATTTTCTGGTCTAACATTGACGCTGAGGC
TCGAAAGCGTGGGGAGCGAACAGGATTAGATACCCTGGTAGTCCACGCCGTAAACGATGAGTG
CTAAGTGTTGGGGGCTTTCCGGCCCTCGGTGCTGGAGCTAACGTATTAAGCACTCCGCCTGGG
GATTACGACCGCAAGGTTGAAACTCAAAAGAATTGACGGGGACCCGCACAAGCGGTGGAGCAT
GTGGTTTAATTCGAAGCAACGCGAAGAACCTTACCAGCTCTTGACATCTTCTGACAACTCTAGAG
ATAGAGCGTTCCCTTCGGGGACAGAATGACAGGTGGTGCATGGTTGTCGTCAGCTCGTGTCGT
GAGATGTTGGGTTAAGTCCCGTAACGAGCGCAACCCTTGTTGTTAGTTGCCAGCATTAAGTTGG
GCACTTTAACGAGACTGCCGGTGATAAACCGGAGGAAGGCGGGGATGACGTCAAATCATCATG
CCCCTTATGAGCTGGGCTACACACGTGCTACAATGGATGGTACAACGAGCAGCGATCCCGCAA
GGGCTAGCTAATCTTTCAAAGCCATTCTCAGTTCGGATTGCACTCTGCAACTCGAGTGCATGAA
GTCGGAATCGCTAGTAATCGCGAATCAGAATGTCGCGGTGAATCCGTTCCCGGGTCTTGTACAC
ACCGCCCGTCACACCACGAGAGTTTGAAACACCCGAAGTCGGCCGGCCAACCCTATGGGAGGC
AGCCGTCGAAGGTGGGTTGAATGATTGGGGTGAAGTCGTAACAAGGTAGCCGTATCGGAAGGT
GCGGCTGGATCACCTCCTTT

FIG. 15

TCNCTGCTTGCAGTGANTGATTAGTGGCGAACGGGTGAGTAACACGTGAGGAACTTGCCCATG
AGCGGGGGACAACATTCGGAAACGGATGCTAATACCCCATAGGTGGATTGGTCGCATGACGAA
TTCATTAAAGGTGGCTTTGCTACCACTCATGGATAGCCTCGCGGCGTATTAGCTAGTTGGTAAG
GTAATGGCTTACCAAGGCAGTGATACGTAGCCGACTTGAGAGGGTGATCGGCCACACTGGGAC
TGAGACACGGCCCAGACTCCTACGGGAGGCAGCAGTAGGGAATCTTCCACAATGGGTGCAAAC
CTGATGGAGCAATGCCGCGTGAGTGAAGAAGGTCTTCGGATCGTAAAGCTCTGTTGTTAGAGAA
GAACACGTGCTAGGTAACTACTAGCGCCTTGACGGTATCTAACCAGAAAGTCACGGCTAACTAC
GTGCCAGCAGCCGCGGTAATACGTAGGTGACAAGCGTTGTCCGGATTTATTGGGCGTAAAGGG
AGCGCAGGCGGTCTGTTTAGTCTAATGTGAAAGCCCACGGCTTAACCGTGGAACGGCATTGGA
AACTGACAGACTTGAATGTAGAAGAGGAAAAATGGAATTCCAAGTGTAGCGGTGGAATGCGTAG
ATATTTGGAGGAACACCAGTGGCGAAGGCGATTTTCTGGTCTAACATTGACGCTGAGGCTCGAA
AGCGTGGGGAGCGAACAGGATTAGATACCCTGGTAGTCCACGCCGTAAACGATGAGTGCTAAG
TGTTGGGGGCTTTCCGGCCCTCGGTGCTGGAGCTAACGTATTAAGCACTCCGCCTGGGGATTA
CGACCGCAAGGTTGAAACTCAAAAGAATTGACGGGGACCCGCACAAGCGGTGGAGCATGTGGT
TTAATTCGAAGCAACGCGAAGAACCTTACCAGCTCTTGACATCTTCTGACAACTCTAGAGATAGA
GCGTTCCCTTCGGGGACAGAATGACAGGTGGTGCATGGTTGTCGTCAGCTCGTGTCGTGAGAT
GTTGGGTTAAGTCCCGTAACGAGCGCAACCCTTGTTGTTAGTTGCCAGCATTAAGTTGGGCACT
TTAACGAGACTGCCGGTGATAAACCGGAGGAAGGCGGGGATGACGTCAAATCATCATGCCCCT
TATGAGCTGGGCTACACACGTGCTACAATGGATGGTACAACGAGCAGCGATCCCGCAAGGGCT
AGCTAATCTTTCAAAGCCATTCTCAGTTCGGATTGCACTCTGCAACTCGAGTGCATGAAGTCGGA
ATCGCTAGTAATCGCGAATCAGAATGTCGCGGTGAATCCGTTCCCGGGTCTTGTACACACCGCC
CGTCACACCACGAGAGTTTGAAACACCCGAAGTCGGCCGGCCAACCCTA

SEQUENCE LISTING

```
<160> NUMBER OF SEQ ID NOS: 14

<210> SEQ ID NO 1
<211> LENGTH: 1543
<212> TYPE: RNA
<213> ORGANISM: Dolosigranulum pigrum
<220> FEATURE:
<223> OTHER INFORMATION: 16S rRNA

<400> SEQUENCE: 1
atgagagttt gatcttggct caggacgaac gctggcggca tgcctaatac atgcaagtcg      60
aacgatgata tcactgcttg cagtgattga ttagtggcga acgggtgagt aacacgtgag     120
gaacttgccc atgagcgggg gacaacattc ggaaacggat gctaataccc cataggtgga     180
```

```
ttggtcgcat gacgaattca ttaaaggtgg ctttgctacc actcatggat agcctcgcgg      240
cgtattagct agttggtaag gtaatggctt accaaggcag tgatacgtag ccgacttgag      300
agggtgatcg ccacactgg gactgagaca cggcccagac tcctacggga ggcagcagta       360
gggaatcttc cacaatgggt gcaaacctga tggagcaatg ccgcgtgagt gaagaaggtc      420
ttcggatcgt aaagctctgt tgttagagaa gaacacgtgc taggtaacta ctagcgcctt      480
gacggtatct aaccagaaag tcacggctaa ctacgtgcca gcagccgcgg taatacgtag      540
gtgacaagcg ttgtccggat ttattgggcg taaagggagc gcaggcggtc tgtttagtct      600
aatgtgaaag cccacggctt aaccgtggaa cggcattgga aactgacaga cttgaatgta      660
gaagaggaaa atggaattcc aagtgtagcg gtggaatgcg tagatatttg gaggaacacc      720
agtggcgaag gcgattttct ggtctaacat tgacgctgag gctcgaaagc gtggggagcg      780
aacaggatta gataccctgg tagtccacgc cgtaaacgat gagtgctaag tgttgggggc      840
tttccggccc tcggtgctgg agctaacgta ttaagcactc cgcctgggga ttacgaccgc      900
aaggttgaaa ctcaaaagaa ttgacgggga cccgcacaag cggtggagca tgtggtttaa      960
ttcgaagcaa cgcgaagaac cttaccagct cttgacatct tctgacaact ctagagatag     1020
agcgttccct tcggggacag aatgacaggt ggtgcatggt tgtcgtcagc tcgtgtcgtg     1080
agatgttggg ttaagtcccg taacgagcgc aaccccttgtt gttagttgcc agcattaagt     1140
tgggcacttt aacgagactg ccggtgataa accggaggaa ggcggggatg acgtcaaatc     1200
atcatgcccc ttatgagctg ggctacacac gtgctacaat ggatggtaca acgagcagcg     1260
atcccgcaag ggctagctaa tctttcaaag ccattctcag ttcggattgc actctgcaac     1320
tcgagtgcat gaagtcggaa tcgctagtaa tcgcgaatca gaatgtcgcg gtgaatccgt     1380
tcccgggtct tgtacacacc gcccgtcaca ccacgagagt ttgaaacacc cgaagtcggc     1440
cggccaaccc tatgggaggc agccgtcgaa ggtgggttga atgattgggg tgaagtcgta     1500
acaaggtagc cgtatcggaa ggtgcggctg gatcacctcc ttt                      1543
```

<210> SEQ ID NO 2
<211> LENGTH: 1383
<212> TYPE: RNA
<213> ORGANISM: Dolosigranulum pigrum
<220> FEATURE:
<223> OTHER INFORMATION: 16S rRNA
<220> FEATURE:
<221> NAME/KEY: unsure
<222> LOCATION: 3
<223> OTHER INFORMATION: /note="A G T or C"
<220> FEATURE:
<221> NAME/KEY: unsure
<222> LOCATION: 17
<223> OTHER INFORMATION: /note="A G T or C"
    /note="A G T or C"
<220> FEATURE:
<221> NAME/KEY: unsure
<222> LOCATION: 17
<223> OTHER INFORMATION: /note="A G T or C"

<400> SEQUENCE: 2

```
tcnctgcttg cagtgantga ttagtggcga acgggtgagt aacacgtgag gaacttgccc       60
atgagcgggg gacaacattc ggaaacggat gctaataccc cataggtgga ttggtcgcat      120
gacgaattca ttaaaggtgg ctttgctacc actcatggat agcctcgcgg cgtattagct      180
agttggtaag gtaatggctt accaaggcag tgatacgtag ccgacttgag agggtgatcg      240
gccacactgg gactgagaca cggcccagac tcctacggga ggcagcagta gggaatcttc      300
```

| | |
|---|---|
| cacaatgggt gcaaacctga tggagcaatg ccgcgtgagt gaagaaggtc ttcggatcgt | 360 |
| aaagctctgt tgttagagaa gaacacgtgc taggtaacta ctagcgcctt gacggtatct | 420 |
| aaccagaaag tcacggctaa ctacgtgcca gcagccgcgg taatacgtag gtgacaagcg | 480 |
| ttgtccggat ttattgggcg taaagggagc gcaggcggtc tgtttagtct aatgtgaaag | 540 |
| cccacggctt aaccgtggaa cggcattgga aactgacaga cttgaatgta gaagaggaaa | 600 |
| aatggaattc caagtgtagc ggtggaatgc gtagatattt ggaggaacac cagtggcgaa | 660 |
| ggcgattttc tggtctaaca ttgacgctga ggctcgaaag cgtggggagc gaacaggatt | 720 |
| agataccctg gtagtccacg ccgtaaacga tgagtgctaa gtgttggggg ctttccggcc | 780 |
| ctcggtgctg gagctaacgt attaagcact ccgcctgggg attacgaccg caaggttgaa | 840 |
| actcaaaaga attgacgggg acccgcacaa gcggtggagc atgtggttta attcgaagca | 900 |
| acgcgaagaa ccttaccagc tcttgacatc ttctgacaac tctagagata gagcgttccc | 960 |
| ttcggggaca gaatgacagg tggtgcatgg ttgtcgtcag ctcgtgtcgt gagatgttgg | 1020 |
| gttaagtccc gtaacgagcg caaccccttgt tgttagttgc cagcattaag ttgggcactt | 1080 |
| taacgagact gccggtgata aaccggagga aggcgggat gacgtcaaat catcatgccc | 1140 |
| cttatgagct gggctacaca cgtgctacaa tggatggtac aacgagcagc gatcccgcaa | 1200 |
| gggctagcta atctttcaaa gccattctca gttcggattg cactctgcaa ctcgagtgca | 1260 |
| tgaagtcgga atcgctagta atcgcgaatc agaatgtcgc ggtgaatccg ttcccgggtc | 1320 |
| ttgtacacac cgcccgtcac accacgagag tttgaaacac ccgaagtcgg ccggccaacc | 1380 |
| cta | 1383 |

<210> SEQ ID NO 3
<211> LENGTH: 21
<212> TYPE: DNA
<213> ORGANISM: Artificial Sequence
<220> FEATURE:
<223> OTHER INFORMATION: Forward primer CYC1

<400> SEQUENCE: 3
catgtcccag atagccaagg a                                         21

<210> SEQ ID NO 4
<211> LENGTH: 22
<212> TYPE: DNA
<213> ORGANISM: Artificial Sequence
<220> FEATURE:
<223> OTHER INFORMATION: Reverse Primer CYC1

<400> SEQUENCE: 4
cttgtgccgc tttatggtgt ag                                        22

<210> SEQ ID NO 5
<211> LENGTH: 25
<212> TYPE: DNA
<213> ORGANISM: Artificial Sequence
<220> FEATURE:
<223> OTHER INFORMATION: Forward Primer ATP5B

<400> SEQUENCE: 5
gcaggaaaga attaccacta ccaag                                     25

<210> SEQ ID NO 6
<211> LENGTH: 21
<212> TYPE: DNA
<213> ORGANISM: Artificial Sequence

```
<220> FEATURE:
<223> OTHER INFORMATION: Reverse Primer ATP5B

<400> SEQUENCE: 6
tggtagcatc caaatgggca a                                            21

<210> SEQ ID NO 7
<211> LENGTH: 22
<212> TYPE: DNA
<213> ORGANISM: Artificial Sequence
<220> FEATURE:
<223> OTHER INFORMATION: Forward Primer IL1beta

<400> SEQUENCE: 7
ttgctcaagt gtctgaagca gc                                           22

<210> SEQ ID NO 8
<211> LENGTH: 22
<212> TYPE: DNA
<213> ORGANISM: Artificial Sequence
<220> FEATURE:
<223> OTHER INFORMATION: Reverse Primer IL1beta

<400> SEQUENCE: 8
caagtcatcc tcattgccac tg                                           22

<210> SEQ ID NO 9
<211> LENGTH: 20
<212> TYPE: DNA
<213> ORGANISM: Artificial Sequence
<220> FEATURE:
<223> OTHER INFORMATION: Forward Primer IL8

<400> SEQUENCE: 9
tggcagcctt cctgatttct                                              20

<210> SEQ ID NO 10
<211> LENGTH: 22
<212> TYPE: DNA
<213> ORGANISM: Artificial Sequence
<220> FEATURE:
<223> OTHER INFORMATION: Reverse Primer IL8

<400> SEQUENCE: 10
ttagcactcc ttggcaaaac tg                                           22

<210> SEQ ID NO 11
<211> LENGTH: 19
<212> TYPE: DNA
<213> ORGANISM: Artificial Sequence
<220> FEATURE:
<223> OTHER INFORMATION: Forward primer TNF

<400> SEQUENCE: 11
cctctgatgg caccaccag                                               19

<210> SEQ ID NO 12
<211> LENGTH: 20
<212> TYPE: DNA
<213> ORGANISM: Artificial Sequence
<220> FEATURE:
<223> OTHER INFORMATION: Reverse Primer TNF

<400> SEQUENCE: 12
tcttctcgaa ccccgagtga                                              20
```

```
<210> SEQ ID NO 13
<211> LENGTH: 18
<212> TYPE: DNA
<213> ORGANISM: Artificial Sequence
<220> FEATURE:
<223> OTHER INFORMATION: Forward Primer MUC5AC

<400> SEQUENCE: 13
gggacttctc ctaccaat                                                 18

<210> SEQ ID NO 14
<211> LENGTH: 24
<212> TYPE: DNA
<213> ORGANISM: Artificial Sequence
<220> FEATURE:
<223> OTHER INFORMATION: Reverse Primer MUC5AC

<400> SEQUENCE: 14
tatatggtgg atcctgcagg gtag                                          24
```

DOLOSIGRANULUM PIGRUM STRAINS AND USES THEREOF

FIELD OF THE INVENTION

The present invention relates to novel isolated bacterial strains of the *Dolosigranulum pigrum* species and variants thereof having at least 99% sequence identity in its 16S rRNA gene to said novel strains. The present invention further relates to the use of these bacterial strains, and compositions comprising said strains for use as a probiotic, such as for improving or restoring the flora/microbiota of the respiratory tract and skin. The present invention further relates to the use of these bacterial strains as an antibacterial agent; for use in human or veterinary medicine; for use in the treatment of human or veterinary diseases; or for use in personal hygiene industry, food industry, cleaning industry, pharma industry, or biocontrol applications.

BACKGROUND TO THE INVENTION

Infections of the upper respiratory tract are among the leading causes of antibiotic use in humans and animals worldwide. In children, one of the most common consequences of an upper respiratory tract (URT) infection is otitis media (OM). OM encompasses a spectrum of disease conditions characterized by accumulation of fluid in the middle ear cavity and inflammation of the middle ear cleft. Acute otitis media (AOM) is the rapid onset of acute infection with viral or bacterial pathogens within the middle ear, characterized by signs and symptoms such as otalgia and fever. The rates of antibiotic prescriptions for AOM vary from 56% in the Netherlands to 95% in the USA. Because of the global problem of antibiotic resistance (estimated to kill more people than cancer by 2050; earmarked by WHO as one of the primary problems facing healthcare) and the collateral damage on the microbiome, it is evident that all efforts that can reduce antibiotic use should be considered. Chronic rhinosinusitis (CRS) is a chronic inflammatory disorder, characterized by inflammation of the nasal cavity and paranasal sinuses, with symptoms lasting for more than 12 weeks. It is a heterogeneous disease where generally two major phenotypes are distinguished: CRS with nasal polyps (CRSwNP) and CRS without nasal polyps (CRSsNP). However, sub-classifying CRS in CRSwNP and CRSsNP does not provide a full insight into the underlying pathophysiology. There is a clear need to better understand the underlying pathology and to identify new biological markers, such as specific microbiome features, to further differentiate patient subgroups, and to develop new therapeutic strategies. Most CRS patients receive an antibiotic treatment, without much relief. Also in animals, antibiotics are frequently used to prevent or treat respiratory tract infections, without always knowing the underlying bacterial cause.

Recently, studies revealed a possible role for the microbiome in the pathology of OM and CRS, based on altered bacterial diversity and the involvement of certain pathogenic bacteria, but results are conflicting. Related to the diversity of the OM and CRS microbiome, some studies have reported decreased bacterial alpha-diversity (number of bacterial taxa in the samples), whereas other studies found no significant differences in alpha-diversity. Several research groups have also tried to identify bacterial members that have a potential causative or beneficial relationship in the pathology of OM and CRS. For instance, *Corynebacterium tuberculostearicum/accolens*, Cyanobacteria and *Staphylococcus aureus* appear to be significantly enriched in the sinuses of middle meatus of CRS patients. For acute OM (AOM), *Streptococcus pneumoniae, Haemophilus influenzae* and *Moraxella catarrhalis* have long been described as the three main pathogens related to AOM, originating from the nasopharynx as main reservoir. For the more chronic forms of OM, such as otitis media with effusion (OME), also other pathogens such as *Alloiococcus otitidis* and *Turicella* have been identified.

In contrast to these potential pathobionts, other microorganisms such as *Lactobacillus, Propionibacterium, Burkholderia*, and *Peptoniphilus* have been proposed to promote URT health. Similarly, lactobacilli and specific streptococci seem to promote nasopharynx health in children. Nevertheless, much remains to be discovered about the topographical occurrence of potential pathobionts and beneficial microorganisms in specific locations of the URT and health conditions. In this study, we performed an integrated microbiome analysis of the URT of adults and children for two main chronic URT diseases, on the one hand CRS in adults and on the other hand OME in children. For CRS, topographical differences and continuity of four major niches of the URT, i.e. anterior nasal cavity, nasopharynx, maxillary and ethmoid sinus, were studied. We also aimed to investigate whether the anterior nasal cavity and/or nasopharynx could be representative niches for the maxillary and ethmoid sinus microbiome. Therefore, samples from 225 CRS patients were collected, subjected to Illumina MiSeq sequencing and analyzed at a fine-scale, amplicon sequence variant (ASV) level. Microbial samples from CRS patients and healthy controls (n=100) were compared to explore differences in bacterial alpha and beta-diversity and to identify species that might have an impact on disease severity and/or health. Finally, the microbiome profiles were correlated with patient characteristics, CRS phenotype features and inflammatory markers measured in the serum of the CRS patients. For the OME patients, the nasopharynx microbiome of 70 children suffering from persistent middle ear effusion (chronic otitis media with effusion for at least 3 months) was compared to that of two healthy control groups: (1) 12 cochlear implant recipients without a recent history of otitis media, and (2) 41 children healthy enough to attend day care. Both microbiome comparisons showed reduced *Dolosigranulum* levels in the patients with chronic URT infections. We then managed to isolated *Dolosigranulum pigrum* strains and substantiate their beneficial potential.

In the present invention, it was surprisingly found that *Dolosigranulum pigrum* species isolated from the nose and/or nasopharynx can also have probiotic potential.

SUMMARY OF THE INVENTION

The present invention is directed to novel isolated bacterial strains of the *Dolosigranulum pigrum* species having at least 99% sequence identity in its 16S rRNA with a strain selected from the strains deposited under accession number LMG P-31124 or LMG P-31154.

In a specific embodiment, the strains of the *Dolosigranulum pigrum* species are selected from the list comprising strains deposited under accession number LMG P-31124 or LMG P-31154.

The present invention further provides compositions comprising bacterial strains as defined herein, i.e. *Dolosigranulum pigrum* species having at least 99% sequence identity in its 16S rRNA with a strain selected from the strains deposited under accession number LMG P-31124 or LMG P-31154; more in particular being a strain deposited under accession number LMG P-31124 or LMG P-31154.

The present invention further relates to the use of the bacterial strains and compositions as defined herein as anti-pathogenic agent, more in particular antibacterial agents. In a particular embodiment, said antipathogenic/antibacterial agents are effective against as an antipathogenic agent, more in particular wherein said antipathogenic agent is effective against one or more bacteria selected from the list comprising: *Corynebacterium tuberculostearicum, C. accolens, Staphylococcus aureus, Haemophilus influenzae, H. aegyptius, Prevotella, Pseudomonas aeruginosa, Moraxella catarrhalis, Streptococcus pneumoniae, Shigella/E. coli; Staphylococcus hyicus, Staphylococcus spp, Haemophilus influenze, Haemophilus aegyptius, Prevotella* spp; and/or against fungal infections with *Candida*.

The present invention further relates to the bacterial strains and compositions as defined herein for use in human or veterinary medicine; more in particular for use in the treatment of diseases selected from the list comprising: disorders of the oronasopharyngeal cavity and ear-nose-throat region, such as acute and chronic (rhino)sinusitis, acute and chronic otitis media, allergic rhinitis, allergic sinusitis, asthma and skin infections with *Staphylococcus aureus*, cystic fibrosis, pneumonia, lung disorders.

Furthermore, the present invention provides the use of the bacterial strains and compositions as defined herein in for personal hygiene industry, food industry, cleaning industry, pharma industry or biocontrol applications.

BRIEF DESCRIPTION OF THE DRAWINGS

With specific reference now to the figures, it is stressed that the particulars shown are by way of example and for purposes of illustrative discussion of the different embodiments of the present invention only. They are presented in the cause of providing what is believed to be the most useful and readily description of the principles and conceptual aspects of the invention. In this regard no attempt is made to show structural details of the invention in more detail than is necessary for a fundamental understanding of the invention. The description taken with the drawings making apparent to those skilled in the art how the several forms of the invention may be embodied in practice.

FIG. 6: Prevalence and relative abundance of *Dolosigranulum* in the URT of healthy participants and CRS patients. A) Based on prevalence, 81% of healthy controls had *Dolosigranulum* in their anterior nares, while this was decreased to 54% in the CRS patients. In the nasopharynx, these numbers were 75% in healthy controls and 42% in the CRS patients. ****p<0.0001. B) Upon presence, mean relative abundances of *Dolosigranulum* were significantly higher in the anterior nares and nasopharynx of healthy controls compared to CRS patients. This difference was more pronounced in the anterior nares than in the nasopharynx. The means per location and condition are indicated with a black dot. *p<0.05.

FIG. 14: SEQ ID No 1: 16S rRNA of AMBR11 (or LMG P-31124) isolate

FIG. 15: SEQ ID No 2: 16S rRNA of AMBR12 (or LMG P-31154) isolate

DETAILED DESCRIPTION OF THE INVENTION

Figure 1:
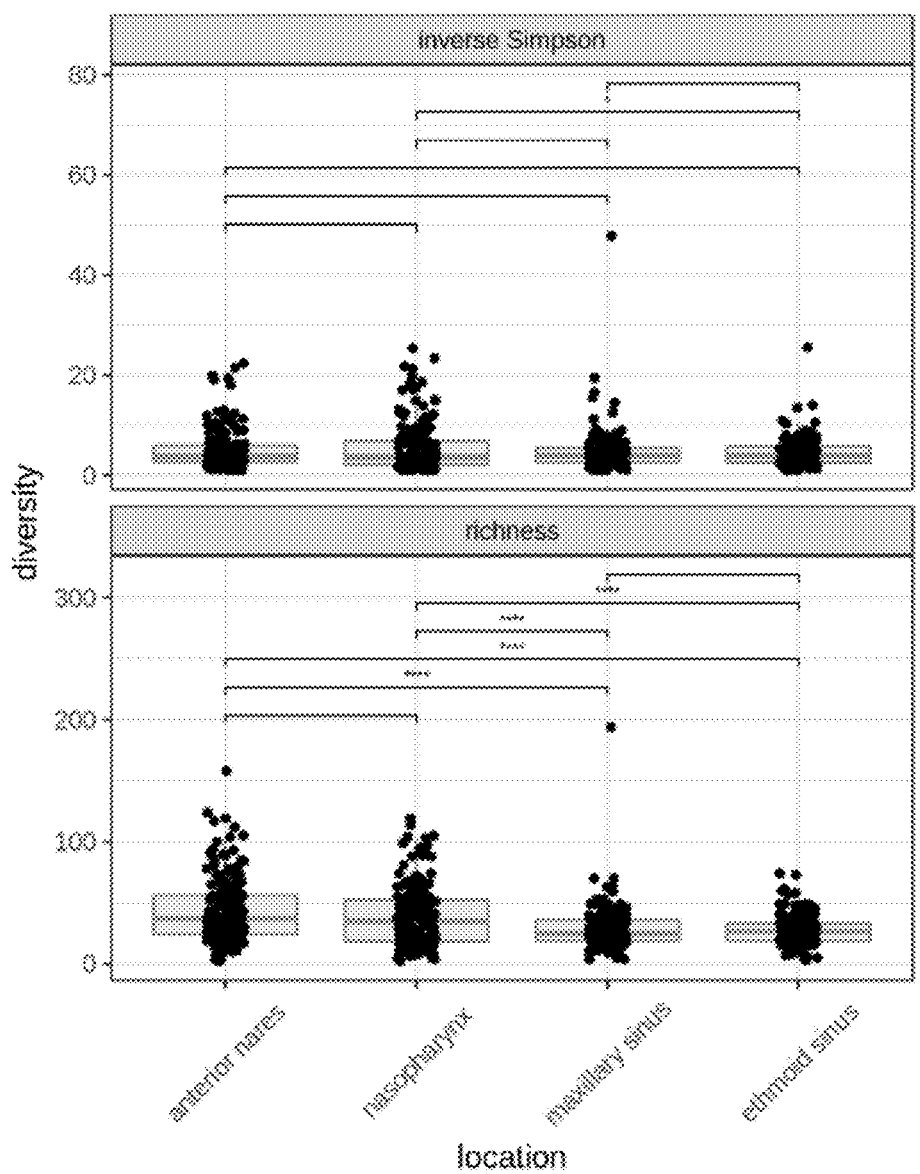
FIG. 1: Bacterial diversity within different URT niches in CRS patients. Comparison of inverse Simpson index (top panel) and richness (bottom panel) of the different URT niches in CRS patients on ASV level. P values (unpaired t-test) smaller than 0.05 were considered significant. Asterisks represent statistically significant differences between the niches (*$p \leq 0.05$, $p \leq 0.01$, *$p \leq 0.001$, ****$p \leq 0.0001$)

As detailed herein above, the present invention relates to novel isolated bacterial strains of the *Dolosigranulum pigrum* species having at least 99% sequence identity in its 16S rRNA with a strain selected from the strains deposited under accession number LMG P-31124 or LMG P-31154.

In a particular embodiment, the present invention provides a *Dolosigranulum pigrum* species having at least 99% sequence identity in its 16S rRNA with SEQ ID No 1 or SEQ ID No 2. Alternatively, the present invention provides a *Dolosigranulum pigrum* species comprising a 16S rRNA represented by SEQ ID No 1 or SEQ ID No 2.

The bacterial strains of the invention may in particular be selected from a *Dolosigranulum pigrum* strain (AMBR11 (OR LMG P-31124)) deposited under accession number LMG P-31124 (deposited at BCCM on Dec. 4 2018) and a *Dolosigranulum pigrum* strain (AMBR12) deposited under accession number LMG P-31154 (deposited at BCCM on Dec. 11 2018).

As is known to those skilled in the art, *Dolosigranulum* is a genus of the Carnobacteriaceae family, a phylogenetically diverse family that contains 17 genera. According to the phylogenetic trees constructed on the basis of 16S rRNA gene sequences, the family Carnobacteriaceae is divided into two subclusters. Most of these genera consist of a single species and have not been well characterized yet. Unlike other industrially important lactic acid bacteria, some genera in this family have been frequently isolated from clinical samples and may be associated with human infections.

*Dolosigranulum* is a genus that belongs to the first subcluster, which also contains the genera *Carnobacterium*, *Bavariicocuus*, *Desemzia*, *Granulicatella*, *Isobaculum* and *Trichococcus* and the second one contains *Alkalibacterium*, *Allofustis*, *Alloiococcus*, *Atopococcus*, *Atopostipes*, *Dolosigranulum*, *Lactigentinum* and *Marinilactibacillus*, *Pisciglobus*, *Jeotgalibaca* and *Atopobacter*.

Another aspect of the invention provides a composition comprising a bacterial strain of the *Dolosigranulum pigrum* species having a least 99% sequence identity in its 16S rRNA with a strain selected from the strains deposited under accession number LMG P-31124 or LMG P-31154; more in particular being a strain deposited under accession number LMG P-31124 or LMG P-31154.

The present invention further relates to the use of the bacterial strains and compositions as defined herein as anti-pathogenic agent, more in particular antibacterial agents.

In a particular embodiment, said antipathogenic/antibacterial agents are effective against as an antipathogenic agent, more in particular wherein said antipathogenic agent is effective against one or more bacteria selected from the list comprising: *Corynebacterium tuberculostearicum*, *C. accolens*, *Staphylococcus aureus*, *Haemophilus influenzae*, *H. aegyptius*, *Prevotella*, *Pseudomonas aeruginosa*, *Moraxella catarrhalis*, *Streptococcus pneumoniae*, *Shigella/E. coli*; *Staphylococcus hyicus*, *Staphylococcus* spp, *Haemophilus influenze*, *Haemophilus aegyptius*, *Prevotella* spp; and/or against fungal infections with *Candida*.

The present invention further relates to the bacterial strains and compositions as defined herein for use in human or veterinary medicine; more in particular for use in the treatment of diseases selected from the list comprising: disorders of the oronasopharyngeal cavity such as acute and chronic (rhino)sinusitis, acute and chronic otitis media, allergic rhinitis, allergic sinusitis, asthma and skin infections with *Staphylococcus aureus*, cystic fibrosis, pneumonia, lung disorders. Furthermore, the present invention provides the use of the bacterial strains and compositions as defined herein in for personal hygiene industry, food industry, cleaning industry, pharma industry or biocontrol applications.

EXAMPLES

Example 1: Identification of *Dolosigranulum pigrum* Species of the Invention

Material and Methods

Study Population and Sample Collection 100 healthy participants were recruited as described previously (De Boeck et al., 2017; de Boeck et 2019). Patients with CRS (n=225), between the age of 18 and 65 that underwent a bilateral functional endoscopic sinus surgery (FESS), were recruited at the University Hospitals of Antwerp and Leuven (study B300201524257). Nasal swabs (Copan, 503CS01) were collected from the anterior nasal cavity and nasopharynx. During FESS, additional samples from the maxillary and ethmoid sinus were collected. Patients with ciliary dyskinesia, inverted papilloma or aspirin intolerance were excluded. A written informed consent was obtained from all participants as well as a blood sample to measure inflammatory markers and a questionnaire with information regarding patients' characteristics and phenotypes (Table 1). Bacterial DNA from the swabs was isolated as described previously (De Boeck et al., 2017).

TABLE 1

Characteristics of CRS patients

| | Patients with CRS (n = 190) |
|---|---|
| Mean age (years +/− SD) | 42 +/− 13 |
| Sex (% male) | 63 |
| Non-smoker (%) | 61 |
| Allergy (%) | 32 |
| Asthma (%) | 22 |
| Polyposis (%) | 44 |
| Prior surgery (FESS) (%) | 43 |
| Nasal and/or oral steroids (%) | 85 |
| Preoperative Antibiotics (%) | 41 |
| Purulence (%) | 31 |
| SNOT-22 (mean +/− SD) | 51 +/− 19 |
| VAS (total symptom score) (mean +/− SD) | 6.8 +/− 2.2 |
| Periostin (pg/ml, geometric mean) | 46.4 +/− 51.4 |
| IFN-γ (pg/ml, geometric mean) | 14.8 +/− 31 |
| IL-5 (pg/ml, geometric mean) | 0.7 +/− 0.7 |
| IL-4 (pg/ml, geometric mean) | Below detection limit |
| IL-13 (pg/ml, geometric mean) | Below detection limit |

Illumina 16S rRNA Amplicon Sequencing and Quality Control of Reads, Taxa and Samples Samples were processed and sequenced as earlier described (De Boeck et al., 2017). Briefly, dual-index paired-end sequencing was performed on the V4 region of the 16S rRNA gene on the MiSeq Desktop sequencer (M00984, Illumina). Processing and quality control of the reads were performed for each run separately using the R package DADA2, version 1.6.0. Briefly, this entailed quality filtering of the reads, dereplication, denoising, removal of chimeras and read classification. The result of these steps was an ASV table with read counts of all ASVs in all samples. After quality control, ASVs not classified to the kingdom Bacteria, classified as chloroplasts or mitochondria and ASVs identified as contamination were removed. The concentration of "qualitative" DNA in each sample was estimated by dividing the number of reads (counted after read and ASV quality control) by the volume of sample pooled on the sequencing run. Samples with DNA concentrations in the range of the negative controls were removed. The sequencing data were deposited in ENA under accession number PRJEB30316.

Data and Statistical Analysis

Figure 5:
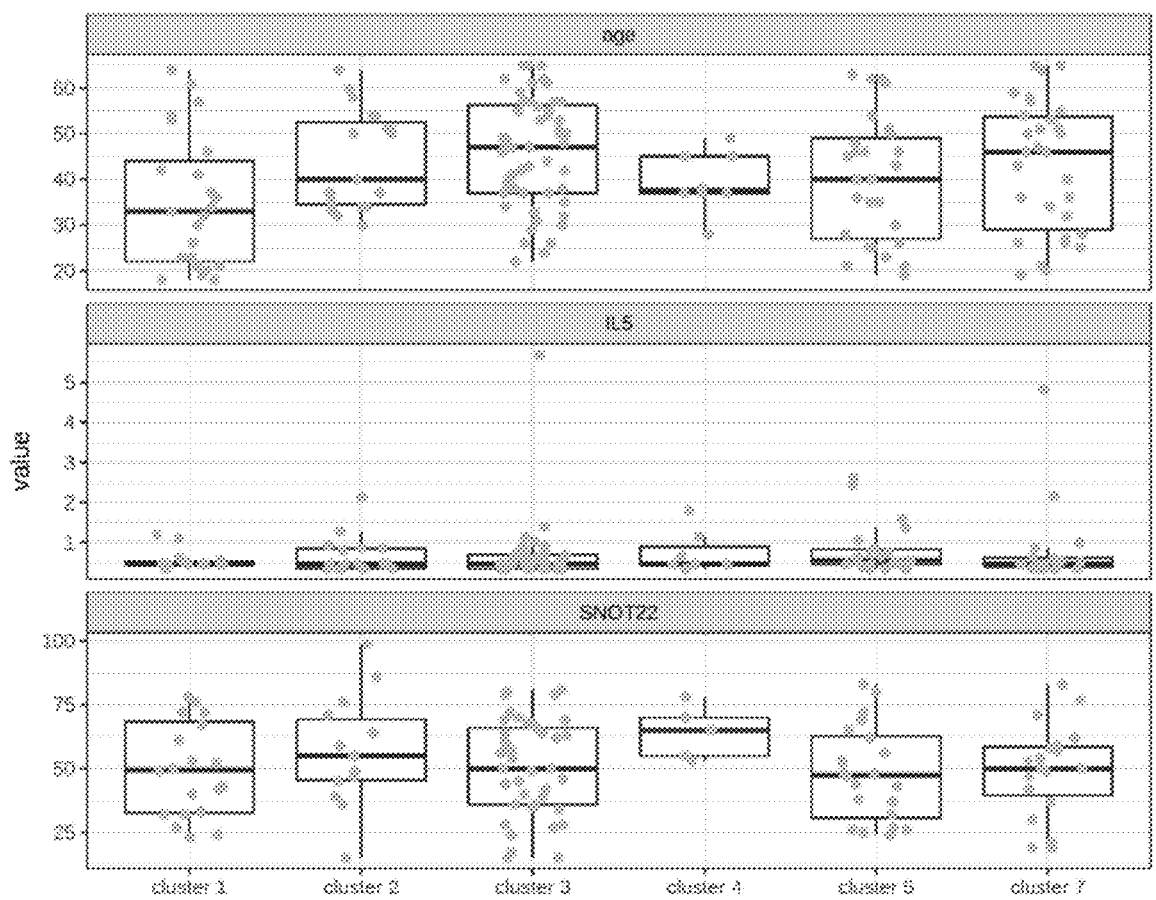
FIG. 5: Associations of numerical microbiome covariates with microbiome-based subject clusters. Box plot visualization of age, IFNγ, IL5, periostin, SNOT22 and VAS-score for the six microbiome clusters. *Haemophilus* (cluster 1), *Moraxella* (cluster 2), *Corynebacterium/Staphylococcus* (cluster 3), *Streptococcus* (cluster 4), *Staphylococcus* (cluster 5) and *Prevotella* (cluster 7).

All data handling and visualization was performed in R version 3.4.4 (R Core Team, 2018) using the tidyverse set of packages and the in-house package tidyamplicons. All analyses were performed on the ASV level, with the exception of the visualization of the top eleven most abundant genera (data not shown) and the clustering of subjects into microbiome types (FIG. 5). Alpha diversity measures were compared using t-tests with the Holm-Bonferroni correction for multiple testing. For all beta diversity analyses, the Bray-Curtis dissimilarity was used. Associations between sample covariates and the microbiome were tested using adonis tests (the function "adonis" of the vegan R package. Differential presence of ASVs between conditions was tested using fisher exact tests on contingency tables between the variables present/absent and condition (CRS/CON). Differential abundance of ASVs was tested using unpaired t-tests on the relative abundance vectors between the conditions. A rarefied version of the data (1000 reads per sample) was used for all alpha diversity analyses, as well as for the differential presence analysis.

Measurement of Inflammatory Cytokines in Serum of Healthy Controls and CRS Patients Serum was collected and stored at −20° C. until subsequent analysis. Periostin was measured using sandwich ELISA, following manufacturer's protocol (Thermofisher, California, USA). The cytokines IL-4, IL-5, IL-13 and IFN-γ were measured using a multiplex 96-well plate-based assay (MesoScale Discovery, Gaithersburg, MD, USA). A detailed description of the procedure can be found in the online data supplement.

Results

Microbiome Continuity in the URT Niches of CRS Patients

225 CRS patients were recruited and their anterior nares, nasopharynx, maxillary and ethmoid sinus were sampled. For each niche, 82%, 80%, 77% and 78% of the samples respectively, passed the quality pipeline. As such, 190 CRS patients with at least one niche with a high-quality profile, were included (Table 1).

*Staphylococcus, Corynebacterium* and *Moraxella* were the most prevalent genera across all niches (data not shown), with mean relative abundances of 22%, 21% and 7.2%, respectively. Although the four niches showed high similarity in the bacterial genera that dominated the samples, certain nasopharynx samples showed a more divergent bacterial profile, enriched with *Haemophilus, Streptococcus* and *Prevotella*. The latter two genera almost never appeared in anterior nares and sinus samples, while *Haemophilus* dominated a subset of maxillary and ethmoid sinus samples.

In the next step, alpha-diversity was calculated (richness and inverse Simpson index, FIG. 1B) at the level of ASVs (subgenus taxonomic level). The average inverse Simpson indices and richness were low, highlighting that only a limited number of bacterial ASVs dominated the anterior nares, nasopharynx, maxillary and ethmoid sinus of a given person. Inverse Simpson indices (FIG. 1, top panel) did not show significant differences in diversity between the four niches. Richness showed to be significantly different, with the highest taxa richness found in the anterior nares (p≤0.05 with nasopharynx, p≤0.0001 with both sinuses), followed by the nasopharynx (p≤0.01 with both sinuses) and the sinuses (FIG. 1, bottom panel). The richness between maxillary and ethmoid sinus was not statistically different (p>0.05).

To further explore the bacterial topography and continuity of the different URT niches both at the inter- and intrapersonal level, Bray-Curtis similarities were calculated between the different locations in the same participant (data not shown), and between niches in different participants (data not shown). Within the same participant, the microbiome structure of maxillary and ethmoid sinus were most similar to each other, with a Bray-Curtis similarity of 0.73. For the anterior nares, median similarities of 0.57 (maxillary sinus) and 0.6 (ethmoid sinus) were observed, while for the nasopharynx, these similarities were 0.42 and 0.44 with the maxillary and ethmoid sinus, respectively. Bray-Curtis similarities between samples from different participants were generally low (median <0.20, both for sample pairs from the same niche and from different niches), indicating that the continuity between the different URT niches is an intrapersonal feature (data not shown).

Bacterial Diversity in the Anterior Nares and Nasopharynx is Impaired in CRSsNP

Since a continuity of the microbial community between both the anterior nares and the nasopharynx with the sinuses in CRS patients was observed, samples from both niches were used for comparison to healthy controls (De Boeck et al., 2017). Within the patient group, 174 high quality profiles from the anterior nares were obtained and 172 for the nasopharynx. In the healthy control group, these numbers were 86 and 94, respectively.

Figure 2:
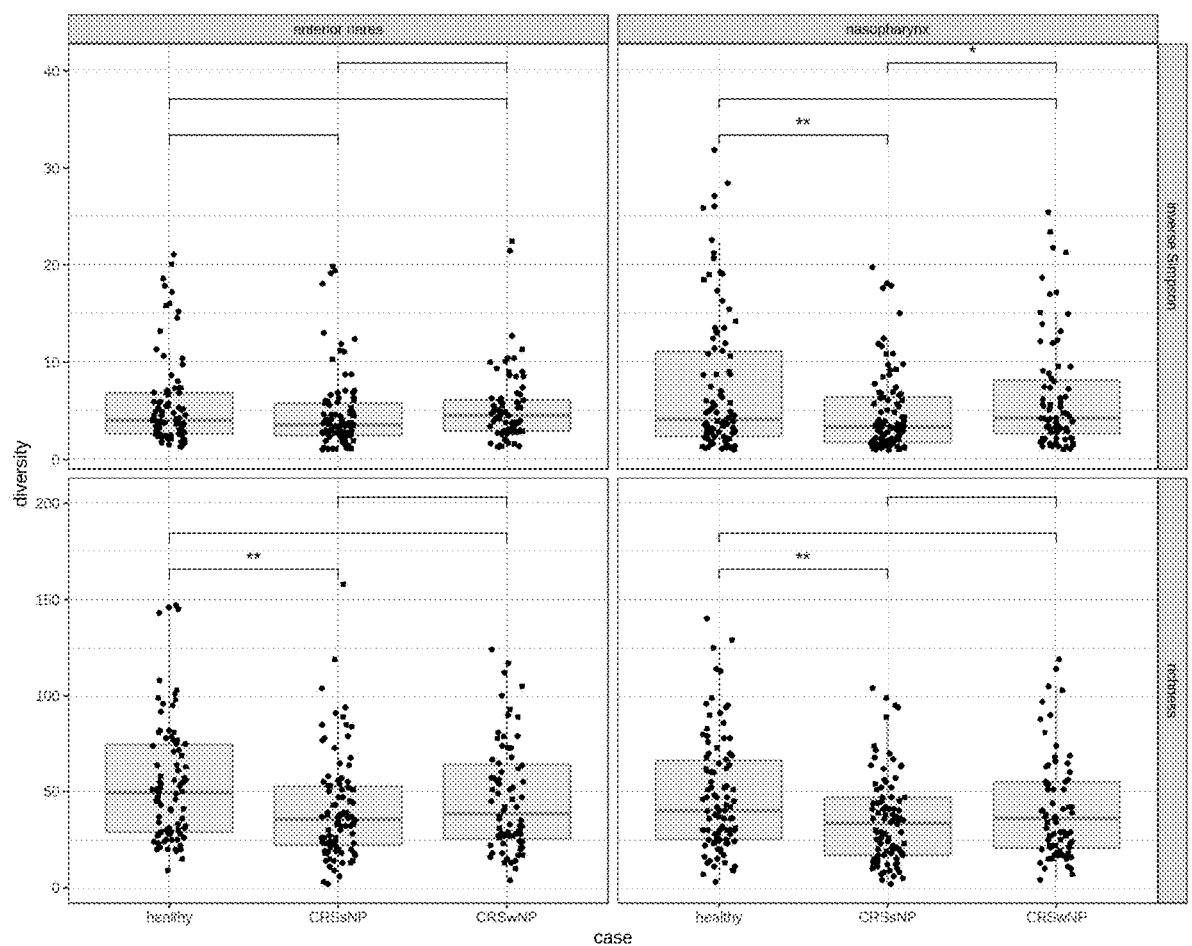
FIG. 2: Comparison of alpha diversity measures between healthy controls, CRSsNP patients and CRSwNP patients in the anterior nares (left panels) and nasopharynx (right panels). Asterisks represent statistically significant differences between the niches (*$p \leq 0.05$, $p \leq 0.01$, *$p \leq 0.001$).

Alpha-diversity was measured, i.e. richness and inverse Simpson, of the different niches in the control and CRS population, divided into CRSsNP and CRSwNP (FIG. 2). When comparing diversity measures, a significant decrease in overall richness was observed in the anterior nares (p=0.002) and nasopharynx in CRSsNP, as well as a significant decrease in inverse Simpson index in the nasopharynx of CRSsNP (p=0.0025) compared to healthy controls. Of interest, for CRSwNP, no decrease in alpha-diversities was observed compared to controls. When CRSsNP and CRSwNP were compared, only the inverse Simpson in the nasopharynx showed an increase in CRSwNP (p=0.042).

Specific Bacterial Taxa are Enriched or Decreased in CRS

To explore specific microbiome differences between healthy controls and CRS patients, the effect size of disease status in our study population was analyzed. For the anterior nares, only 2% of the variation observed within the bacterial community composition could be explained by the fact whether a participant was healthy or had CRS, while for the nasopharynx this was 1%. Next, the bacterial profiles between healthy controls and CRS patients was compared at the level of presence/absence of ASVs, as well as their relative abundances in the anterior nares and nasopharynx (FIG. 3). Although some taxa such as *Moraxella* 1, *Corynebacterium* 2 and 3, *Dolosigranulum* 1 and *Neisseria* 3 were found to be more prevalent in healthy controls versus CRS patients, only *Dolosigranulum* 1 (*D. pigrum*), was significantly more associated with the anterior nares of healthy controls based on both presence/absence and relative abundance (present in 62% CON and 30% CRS samples, mean relative abundance of 0.13 in CON and 0.05 in CRS).

Figure 3A:
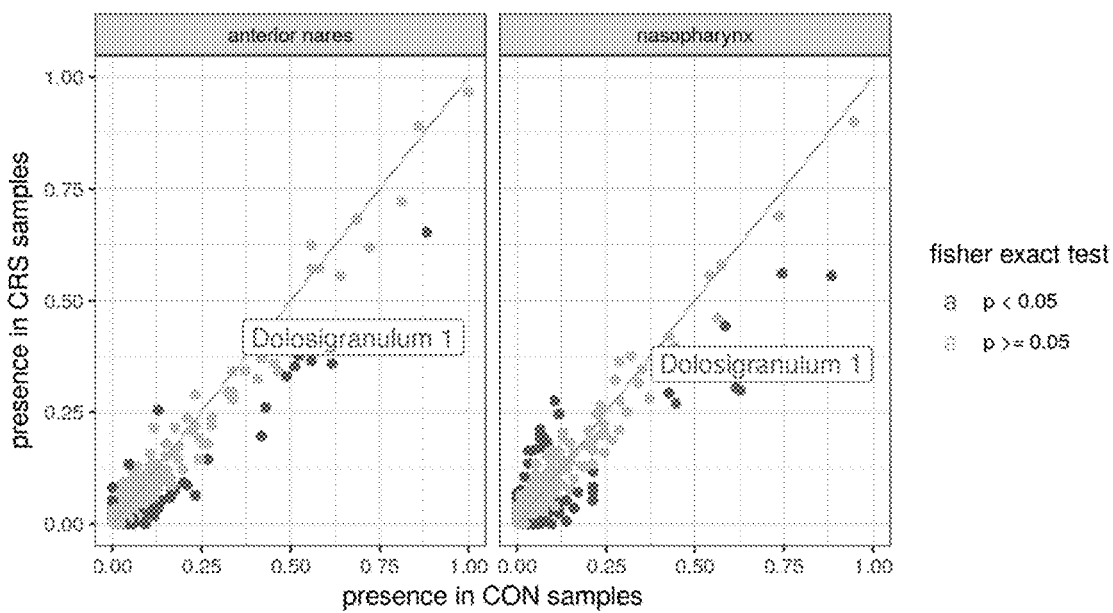
FIG. 3: Differences in bacterial communities in healthy controls (CON) and CRS patients based on presence/absence (A) and relative abundances (B). A: Correlation between the presence of ASVs in healthy controls (CON) and CRS patients in the anterior nares (left panel) and the nasopharynx (right panel). A Fisher exact test was used to test significance of ASVs that are more present in healthy controls or CRS patients ($p \leq 0.05$). Only ASVs with a significant presence and more than 25% presence in at least one of the conditions are shown with a name label. B: Correlation between the mean relative abundance of ASVs in healthy controls and CRS patients in the anterior nares (left panel) and the nasopharynx (right panel). Only ASVs with a mean relative abundance greater than 30% in at least one of the conditions are shown with a name label.
Figure 3B:
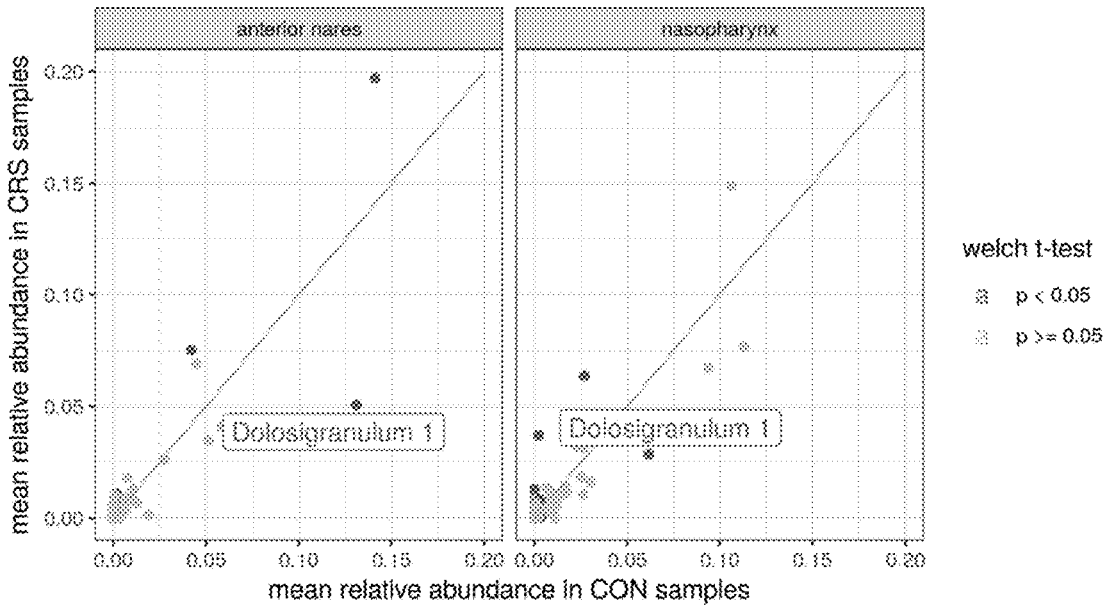

In the nasopharynx, *Moraxella* 1, *Corynebacterium* 2 and 3, *Dolosigranulum* 1 and *Neisseria* 3 occurred more in healthy controls (FIG. 3A, right panel). Similar as for the anterior nares, *Dolosigranulum pigrum* was more prevalent in the healthy nasopharynx (62% CON versus 25% in CRS), and showed a higher relative abundance in healthy controls compared to CRS patients (mean relative abundance of 0.06 versus 0.03 in CRS).

Disease Related Characteristics are not Associated with Microbiome Profiles

Figure 4:
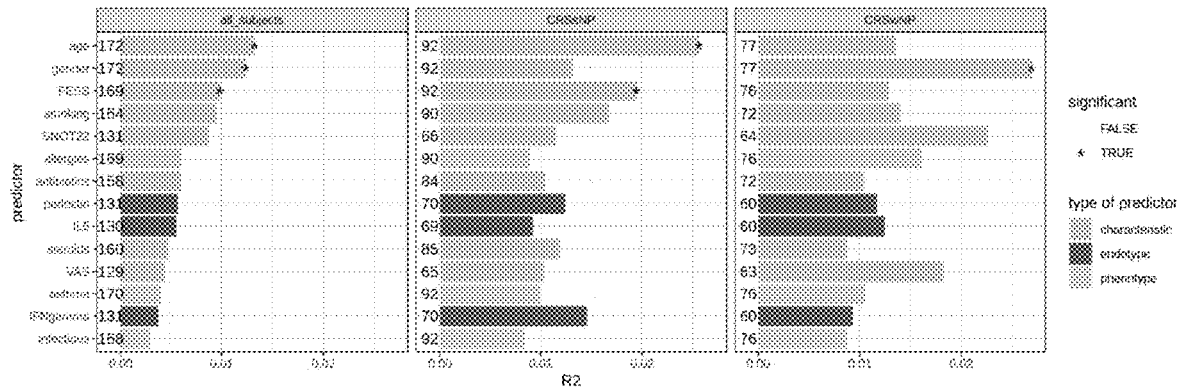
FIG. 4: Associations between the nasopharyngeal microbiome profiles of CRS patients (n=172) and covariates. Adonis tests were performed for each covariate, either in all CRS subjects (left panel), only the CRSsNP subjects (middle panel) and only the CRSwNP subjects (right panel). The bars represent effects sizes of the covariates (R2 values); statistical significance (p<0.05) is indicated with a star. Covariates are colored based on metadata category. The numbers depicted next to each bar represent the number of subjects used in the adonis model. *Dolosigranulum* is indicated.

Since CRS is characterized by different pheno- and endotypes, we intended to study the microbiome in relation to various relevant features describing phenotypes and inflammatory markers (data not shown). Associations were investigated for the high-quality nasopharynx samples in our CRS group (n=172). First, associations were made for the whole study cohort, followed by subdivision in CRSsNP and CRSwNP (FIG. 4). Within the category of patient characteristics, the microbiome composition in CRS patients was significantly influenced by the age of the patients (p=0.002), but only in CRSsNP. Also gender showed an association with the overall microbiome structure in the study cohort (p=0.005), but this was only significant in the CRSwNP group. History of FESS was only associated with the overall microbiome in CRSsNP (p=0.043), indicating that these participants who underwent a previous FESS have slightly different bacteria than participants who never had a FESS before. Asthma, allergy and infectious did not show significant associations with the overall microbiome structure, neither did the different inflammatory markers tested (FIG. 4).

To look deeper into the associations observed for gender, age and history of FESS, all patients were clustered into microbiome clusters based on the abundance of ASVs (data not shown). Six clusters (having more than 5 participants) were used for further analysis, dominated by *Haemophilus* (cluster 1), *Moraxella* (cluster 2), a mixed cluster of *Corynebacterium/Staphylococcus* (cluster 3), *Streptococcus* (cluster 4), *Staphylococcus* (cluster 5) and *Prevotella* (cluster 7). Cluster 6 was not included because it had less than 5 participants. We then visually compared these microbiome clusters with all patient variables. Each cluster was analysed against the numerical (data not shown) and categorical (FIG. 5) microbiome covariates that were documented. For gender and history of FESS, female participants and participants with a history of FESS were slightly more present in cluster 4 and cluster 5 (FIG. 5). For age, participants within cluster 1 seemed to have a lower mean age (data not shown). Disease-related parameters such as polyps, SNOT22 and VAS-scores showed no association with the clusters, neither did one of the tested inflammatory markers (FIG. 5).

Discussion

Several studies have explored the URT microbiome in CRS patients with contradictory results regarding microbiome composition and diversity. In this study, the URT microbiome of a large cohort of 225 CRS patients was compared with the microbiome of 100 healthy individuals. This comparison included an analysis of the microbiome similarity between the anterior nares, nasopharynx, and the maxillary and ethmoid sinus in CRS patients. Of interest, the microbiome of the anterior nares showed more similarity to the sinuses than to the nasopharynx. This is unexpected, since the nasopharynx is a bacterial reservoir to other URT niches and the nares stand in direct contact with external air (De Boeck et al. 2017). The fact that the microbiome of the anterior nares represents better the CRS microbiome, is an important observation for clinicians who cannot access the sinuses, unless during surgery. Our findings confirm previous results, showing that the microbiome in nostril and middle meatus could represent sinus microbiome in CRS patients.

Altered bacterial diversity is often explored as a hallmark of chronic polymicrobial diseases that are not caused by a specific pathogen, including CRS. We observed decreased bacterial diversity in the anterior nares and nasopharynx in CRSsNP compared to healthy controls but not in CRSwNP (data not shown). These results confirm recent work where a decreasing trend in bacterial richness in the middle meatus of CRSsNP and not in CRSwNP patients compared to controls was found (Koeller et al., 2018). However, another study showed decreased bacterial diversity in the middle meatus region of CRSwNP patients compared to healthy controls (Chalermwatanachai et al., 2018). In a larger study using middle meatus samples, no significant differences in alpha diversity between control subjects and CRS patients were found (Mahdavinia et al., 2018), which was also confirmed by others. These discrepancies might be explained by (1) inaccurate or not phenotyping CRS in CRSwNP and CRSsNP; (2) under powering of the amount of samples; (3) differences in control samples. Nevertheless, care should be taken when drawing conclusions on bacterial diversity only based on relative microbiome profiling, and supplementation with quantitative microbiome profiling approaches might provide additional insights about the role of bacterial alpha diversity in URT health and disease (De Boeck et al., 2017). However, for the URT, optimization of this quantitative profiling is needed since protocols from high biomass niches such as the gut cannot easily be implemented for low-biomass niches.

Another strength of this study was the comparison of the bacterial profiles from both study groups based on their presence/absence combined with their relative abundances to identify indicator species (data not shown). The most interesting ASV that was more prevalent and showed a higher relative abundance in healthy controls was *Dolosigranulum pigrum*. Previous studies on the URT microbiome in children have investigated the potential protective effects of *Dolosigranulum* for respiratory health (Biesbroek et al., 2014; Laufer et al., 2011). *Dolosigranulum* is a member of the lactic acid bacteria, which are generally known to be beneficial in the human gut and vagina. Future studies are thus needed to validate the health-promoting effects and industrial application potential of *Dolosigranulum*.

Our comparison also revealed several taxa that could be CRS pathobionts based on their increased occurrence or relative abundance. We observed that the relative abundance of *C. tuberculostearicum* was significantly increased in CRS patients compared to healthy controls. These findings build further on previous studies, reporting an increase in relative abundance of *C. tuberculostearicum* in CRS. Another study revealed that *Corynebacterium accolens*, closely related to *C. tuberculostearicum*, was the most abundant species in CRS patients compared to controls. Also *Staphylococcus aureus* forms a key player in the pathology of inflammatory airway diseases. In CRS, an increase in relative abundance of *S. aureus* has been measured in nasal polyp tissue and drives Th2 type inflammation. In line with the literature, our results show that two *Staphylococcus* ASVs were more present and more abundant in the anterior nares of CRS patients compared to healthy controls. However, in this study the V4 region of the 16S rRNA gene was used, which does not discriminate between different *Staphylococcus* species, so we could not further explore whether these ASVs were indeed *S. aureus*. Also two *Haemophilus* ASVs, classified as *H. influenzae* and *aegyptius*, were more abundant in CRS patients compared to healthy controls. *Haemophilus influenzae* is a well-known pathogen of the respiratory tract, and has been linked with CRS, both in culture-based and culture-independent studies. Additionally, in other inflammatory airway diseases, such as severe bronchitis in children, *Haemophilus* has been described as a pathobiont. Finally, two *Prevotella* ASVs were more found in the nasopharynx of CRS patients. This genus has been previously described to be among the most abundant species in the sinuses of CRS patients, but its possible contribution in the disease etiology remains to be explored. The exact role of these pathobionts, remains to be further substantiated in follow-up work. Of note, also the less abundant ASVs should not be ignored, since they might have an impact as well on interspecies relations in the URT.

In the last phase of this study, the association between several patient characteristics and pheno- and endotype-related variables and specific microbiome features was explored. In our patient group, age, gender and history of FESS showed a minor association with the overall microbiome structure, which we also confirmed after clustering the participants in the different microbiome clusters. While these associations were statistically significant, a distinction should be made between significance and biological relevance, since the calculated effect sizes were very small ($<2\%$). Surprisingly, we did not find an association between nasal polyps and the overall microbiome structure, neither with the specific microbiome clusters. Also for allergy, asthma, infection and the tested inflammatory serum markers, no associations were found. This is in contrast to previous studies demonstrating significant associations between the microbiome for asthma and purulence (Ramakrishnan et al., 2015). Although our larger study multicenter cohort had the advantage of more statistical power, there are some drawbacks of the study group. More specifically, for some variables, such as medical treatment and history of smoking, we could only rely on self-reported data of the participants. For instance, the data for previous antibiotic use was based on the question whether antibiotics were taken in the last three months prior to surgery. This might explain why we did not observe differences in microbiome profiles with antibiotic use, while other studies already found a significant impact of antibiotic use on microbiome depletion in different human body niches. Future studies should pay attention to antibiotic use and monitor the exact timing, type and dose of antibiotics used before and during surgery.

To conclude, the microbiome of the anterior nares in CRS was more similar to the sinuses than the nasopharynx, indicating that the anterior nares can be an important niche for potential sinus pathobionts. This relevant finding emphasizes the potential of personalized medical treatment based on sinus microbiome composition via sampling the anterior nares. A decrease in bacterial diversity was observed in CRSsNP and not in CRSwNP, highlighting the difference in pathophysiology between CRSsNP and CRSwNP. These results also suggest that changes in bacterial diversity probably contributes more to disease development in CRSsNP than CRSwNP or the other way around that specific CRSsNP conditions have a larger impact on bacterial diversity than in CRSwNP. Moreover, certain bacterial taxa, such as *C. tuberculostearicum*, *H. influenzae/aegyptius* and one *Staphylococcus* ASV were confirmed or newly revealed as potential pathobionts in CRS. Additionally, *Dolosigranulum pigrum* could have great potential as beneficial bacterium and probiotic for the URT. Future research should focus on mechanistic studies to explore the role of these bacterial taxa in the pathogenesis of CRS.

Example 2: Characterisation of *Dolosigranulum pigrum* Species of the Invention

Material and Methods

Study Design and Sample Collection

Nasopharyngeal samples were obtained from healthy participants and CRS patients in a study (B300201524257) at the University of Antwerp, the Antwerp University Hospital and the University Hospital of Leuven between 2015 and 2018 as previously described (De Boeck et al, 2017, De Boeck et al 2019). All samples were collected in a standardized way by the responsible ENT specialist. A written informed consent was obtained from all participants.

Illumina MiSeq 16S rRNA Amplicon Sequencing and Biostatistical Analysis

Samples were processed, sequenced and analysed as earlier described (De Boeck et al 2017). Briefly, dual-index paired-end sequencing was performed on the V4 region of the 16S rRNA gene on the MiSeq Desktop sequencer (M00984, Illumina) at the Centre of Medical Genetics, University of Antwerp, Belgium. After sequencing, raw sequencing reads were filtered and denoised using DADA2 (v 1.1.6).

Isolation and Whole Genome Sequencing of *Dolosigranulum* Isolate AMBR11 (or LMG P-31124) and AMBR12 (or LMG 31154)

Nasopharyngeal swabs from healthy volunteers were cultivated in liquid brain heart infusion (BHI) supplemented with 0.5% Tween80 to promote growth of *Dolosigranulum* species. Grown cultures were stored at −80° C. until further identification. Next, bacterial stocks were cultivated on tryptic soy agar supplemented with 5% sheep blood. Colonies with similar colony morphology to *D. pigrum* ATCC51524 were further identified using the 16S rRNA gene. After isolation of our own isolate, *D. pigrum* AMBR11 (or LMG P-31124), DNA was extracted and whole genome sequencing was performed with the Nextera XT DNA Sample Preparation kit (Illumina, San Diego, CA), followed by sequencing with the Illumina MiSeq platform (2×300 cycles) at the Center of Medical Genetics Antwerp (University of Antwerp).

*Dolosigranulum pigrum* AMBR12 or LMG P-31154) was isolated from the anterior nare of a healthy child without a history of otitis media, asthma or respiratory allergies using BHI (Brain Heart Infusion) medium supplemented with 0.5% (v/v) Tween 80 incubated at 37° C. Whole genome sequencing followed by comparison to the *D. pigrum* type strain ATCC 51524 confirmed its identity, with an ANI (Average Nucleotide Identity) value of 0.9748 (EZBioCloud ANI calculator1). Neither transferable antibiotic resistance genes nor virulence genes were predicted by screening against the Resfinder and Virulence Factor Data Bases (VFDB), respectively.

Microbial Strains and Culture Conditions

*Dolosigranulum* strains were grown at 37° C. under shaking conditions in BHI broth (supplier), supplemented with 0.5% Tween80. *Lactobacillus rhamnosus* GG (ATCC53103) was grown at 37° C. without shaking in de Man, Rogosa and Sharpe (MRS) broth (Difco, Erebodegem, Belgium).

Cell Culture

The human bronchial epithelial cell line Calu-3 ATCC® HTB-55™ (purchased from ATCC) was cultured at 37° C. with 5% CO2 and 90% relative humidity in 75 cm² cell tissue flasks containing 20 ml Minimal Essential Medium (MEM) (Life technologies, Ghent, Belgium) supplemented with 10% heat inactivated fetal bovine serum (FBS) (supplier) and penicillin-streptomycin (100 U/ml) (Life technologies). Every three or four days, the culture medium was changed and when cells reached 70-80% confluency, cells were reseeded at a 1:2 split ratio using a 0.25% trypsin-EDTA solution (Life Technologies). Calu-3 cells were seeded in 12-well or 24-well culture plates (Cellstar, Diegem, Belgium) for adhesion and immunomodulation experiments respectively, at a density of $3 \times 10^5$ cells/cm² ($1.1 \times 10^{\wedge}6$ cells/ml). Approximately one week after seeding, confluent monolayers were obtained. The human monocytic THP-1 cells (ATCC) and TLR1/2 and TLR2/6-expressing HEK292T cells (Invivogen), were routinely maintained at 37° C. with 5% $CO_2$ and 90% relative humidity in 25 cm² tissue culture flasks in complete RPMI1640 medium supplemented with FBS and penicillin-streptomycin. Cells were reseeded every three days at a ratio of 1:12 by addition of fresh complete RPMI1640 medium. Three days before adhesion and immunomodulation experiments, cells were seeded in 12-well culture plates at a concentration of $1 \times 10^6$ cells/ml with addition of phorbol ester 12-Otetradecanoylphorbol-13-acetate (PMA) (Sigma) (10 ng/ml) for monocytic differentiation.

Isolation and Cultivation of Primary Cells

Inferior turbinates were used for isolation of nasal epithelial cells (NECs). A highly purified NEC population was obtained, as reported previously. Tissue was washed in sterile saline and enzymatically digested in 0.1% Pronase (Protease XIV, Sigma) solution in DMEM-F12 culture medium supplemented with 100 U/mL penicillin, 100 mg/mL streptomycin, and 2% Ultroser G (Pall Life Sciences, Zaventem, Belgium). After overnight incubation at 4° C. while shaking, the protease reaction was stopped by the addition of FCS (10%). Cells were washed in culture medium and pelleted by means of centrifugation for 5 minutes at 100 g. Cells were then resuspended in 10 mL of culture medium and incubated in a plastic culture flask for 1 hour at 37° C. to remove fibroblasts. The cell suspension was mixed with $2 \times 10^7$ prewashed CD45 and CD15 magnetic beads (Dynabeads; Invitrogen, Merelbeke, Belgium), and epithelial cells were purified by means of negative selection, according to the manufacturer's instructions. Cell purity was verified by using cytospin preparations and was found to be 98% or greater.

Freshly isolated NECs were seeded on 0.4 mm, 0.33 cm² polyester Transwell inserts (Costar, Corning, NY) at a density of $10^5$ cells per Transwell as described in Steelant et. al (2016). Medium was refreshed every other day. Once NECs grew to complete confluence, the apical culture medium was removed to allow further cell differentiation in the ALI. At day 21 in the ALI, epithelial integrity was evaluated by using transepithelial resistance (TER) measurements with an EVOM/Endohm (WPI, Sarasota, Fla). Cultures not building up sufficiently (TER, <200 Ω×cm²) were not included in experiments.

Scanning Electron Microscopy

Scanning electron microscopy. Scanning electron microscopy was used to visualize the presence or absence of fimbriae on the bacterial surfaces. Bacteria were spotted on a gold-coated membrane and fixed with 2.5% glutaraldehyde (in 0.1M Na+-cacodylate), for 1 hour at room temperature (RT), followed by a further overnight fixation at 4°

C. Bacteria were then rinsed 3 times for 20 min and left overnight in cacodylate buffer (containing 7.5% saccharose) at 4° C. Subsequently, bacteria were dehydrated in an ascending series of ethanol (50%, 70%, 90%, 95% each for 30 min at RT, and 3×30 min in 100%) and critical point dried in a Leica EM CPD030. The membranes were mounted on a stub and coated with 5 nm of carbon in a Leica EM Ace 600 coater. SEM-imaging was performed with a Quanta FEG250 SEM system (Thermo Fisher, Asse, Belgium).

Adherence Assays to Human Airway and Monocyte/Macrophage Cell Lines and Primary Cells Experiments to assess the adhesion of *L. rhamnosus* GG and *Dolosigranulum* strains to Calu-3 and stimulated THP-1 cells were carried out on the basis of the methods of Lebeer et al. 2012. One ml of the bacterial suspensions at a concentration of $1 \times 10^8$ CFU/ml was added to tissue culture plates containing Calu-3 or stimulated THP-1 cells. Bacteria were incubated with the human cells for one hour at 37° C. to allow adherence. After incubation, cells were once rinsed with prewarmed PBS. To detach the cells, 300 µL of trypsin (0.25%) was added to the cells for 10 minutes at 37° C. After cells were detached, 700 µL PBS was added and serial dilutions were plated out on solid MRS medium for *L. rhamnosus* GG and solid Todd Hewitt for *Dolosigranulum* strains. The percentage of bacterial adhesion was calculated by comparing the total number of colonies counted after adhesion to the number of cells in the bacterial suspension originally added to the human cells.

Induction of Cytokine Gene Expression in Human Aiway and Monocyte/Macrophage Cell Lines One ml of the bacterial suspensions at a concentration of $1 \times 10^8$ CFU/ml was added to tissue culture plates containing Calu-3 or stimulated THP-1 cells. Depending on the cell type, bacteria were incubated for two or four hours, for THP-1 and Calu-3 cells respectively, at 37° C. with 5% $CO_2$ and 90% relative humidity to induce cytokine gene expression. After incubation, cells were rinsed three times with prewarmed PBS. MEM (for Calu-3 cells) and RPMI (for THP-1 cells) was used as negative control. RNA was extracted using the commercially available RNeasy mini kit (QIAGEN), according to the manufacturer's protocol. RNA concentrations were determined using Take3 (Biotek). Cytokine gene expression was determined by quantitative real-time PCR (qPCR) as described below. The experiment was repeated three times and all strains were each time tested in triplicate.

qPCR Analysis

Isolated total RNA (1000 ng) was transcribed to cDNA using Readyscript® cDNA synthesis mix (Sigma Aldrich). Afterward, nuclease-free water was added to a volume of 100 µl. Each sample (final concentration 40 ng) was amplified in duplicate with PowerSYBR Green master mix (Thermofisher scientific) in a total volume of 20 µL. Initially, six common used reference genes were tested as internal controls, namely GAPDH, CYC1, ATP5B, GNB2L1, PPIA and B2M (data not shown). According to the MIQE guidelines, all tested reference genes had good M and CV-scores using Qbase+ software. For further experiments in the Calu3 cells, the CYC1 and ATP5B reference gene were chosen to normalize all results. For THP-1 cells, CYC1 and PPIA were chosen as reference genes for further analysis. qPCR was performed for IL-8, IL-1b, TNF and the depicted reference genes in a StepOnePlus real-time PCR (Applied Biosystems, Lennik, Belgium). All primers were designed on the basis of published sequences (ref) and chemically synthesized by integrated DNA Technologies (IDT) (Table 2). Each qPCR reaction was performed in duplicate in 96-well reaction plates (catalog number; Life Technologies, Ghent, Belgium). The following conditions were used: 50° C. for 10 min for the PowerSYBR and 95° C. for 10 min for initial denaturation, followed by 40 cycles at 95° C. for 15 s and 60° C. for 1 min. qPCR data are presented as a ratio of the amount of cytokine mRNA to the amount of reference mRNA. Non-template controls were included for each run.

TABLE 2

Primers used for qPCR

| Primer | SEQ ID NO | Oligonucleotide sequence (5'-3') |
| --- | --- | --- |
| CYC1(F) | 3 | CATGTCCCAGATAGCCAAGGA |
| CYC1(R) | 4 | CTTGTGCCGCTTTATGGTGTAG |
| ATP5B(F) | 5 | GCAGGAAAGAATTACCACTACCAAG |
| ATP5B(R) | 6 | TGGTAGCATCCAAATGGGCAA |
| IL1β(F) | 7 | TTGCTCAAGTGTCTGAAGCAGC |
| IL1β(R) | 8 | CAAGTCATCCTCATTGCCACTG |
| IL8(F) | 9 | TGGCAGCCTTCCTGATTTCT |
| IL8(R) | 10 | TTAGCACTCCTTGGCAAAACTG |
| TNF(F) | 11 | CCTCTGATGGCACCACCAG |
| TNF(R) | 12 | TCTTCTCGAACCCCGAGTGA |
| MUC5AC(F) | 13 | GGGACTTCTCCTACCAAT |
| MUC5AC(R) | 14 | TATATGGTGGATCCTGCAGGGTAG |

*Galleria mellonella* Survival Assay

*G. mellonella* were purchased from Anaconda reptiles (Kontich, Belgium) in their final larval stage. Upon arrival, the larvae were stored at 4° C. and used within 7 days. Fifteen randomly selected larvae with similar weight and size were used per group. These experiments were done in collaboration with Camille Allonsius in the laboratory of Applied Microbiology and Biotechnology (Allonsius, 2019). To evaluate the safety and tolerability of *D. pigrum* AMBR11 (OR LMG P-31124), the larvae were injected in their last prolegs with 10 µL of bacterial solution in different concentrations using a Hamilton syringe (Hamilton Company). Two control groups were used, one injected with PBS (10 µL) and one without injections to control for general viability. Model probiotic strain *L. rhamnosus* GG and *S. aureus* were used as additional bacterial control, under the same conditions as *D. pigrum* AMBR11 (OR LMG P-31124). The larvae were kept on petridishes at 37° C. and monitored daily for survival. The survival curves were plotted, and statistical analysis was performed via a Kaplan-Meier test (GraphPad Prism 7.00). p-values≤0.05 were considered significant.

Results

Figure 7:
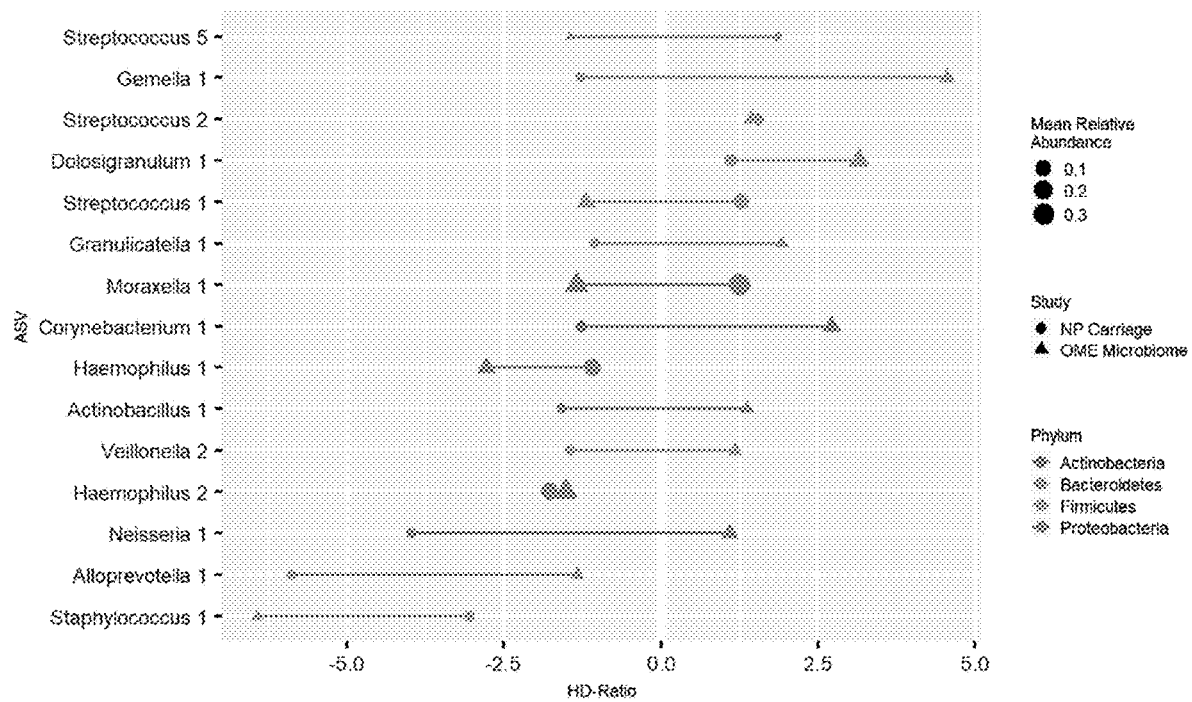
FIG. 7: Differential abundance of taxa in healthy versus children with OME. Taxa present in ≥50% of healthy nasopharynx samples are shown based on relative abundance data. Relative abundance was calculated only considering the samples in which a taxon was present to remove the effect of prevalence. Taxa with a positive Health-Disease (HD) ratio >1 were more abundant in healthy samples, while taxa with a negative HD-ratio <−1 were more abundant in OME samples. The HD-ratios between OME-nasopharynx samples and healthy nasopharynx samples collected in the separate cohorts NP Carriage Study and in the OME Microbiome study were calculated separately, and the individual results are connected by horizontal lines.

Isolation, Characterization and Whole Genome Sequencing of a Dominant *Dolosigranulum* Strain from a Healthy URT Sample In example 1, we found that *Dolosigranulum* is more associated with healthy control participants compared to CRS patients, based on presence and relative abundance. We therefore analyzed this bacterial species into more depth. Over the entire study population, the genus *Dolosigranulum* was found as fifth most dominant member of the URT, with a mean relative abundance of 5%. Mean relative abundances of *Dolosigranulum* in the anterior nares and nasopharynx were significantly higher in the control group compared to the CRS group (welch t-test, p<0.05). In the anterior nares, the mean relative abundance was 13% and 5% for the healthy controls and CRS patients, respectively, while this was 6% in healthy controls and 2% in CRS patients in the nasopharynx (FIG. 6). Of interest, mean relative abundances of *Dolosigranulum* often seem to evolve to a bimodal distribution, especially in the nasopharynx of CRS patients. This is for instance also observed in the gut for the *Bacteroides* enterotype, that can be divided into the B1 and B2 type, where the latter harbours a reduced microbial load (Vandeputte et al., 2017). When evaluating the prevalence of *Dolosigranulum*, 81% and 75% of healthy controls had *Dolosigranulum* in their anterior nares and nasopharynx, respectively, while for CRS patients, these numbers where significantly lower (fisher exact test, p<0.05) with 54% in the anterior nares and 42% in the nasopharynx (FIG. 6). In children, differential abundance analysis identified *Dolosigranulum pigrum* as being present in 70% of both cases and controls, but at a higher relative abundance in both healthy control groups compared to the otitis media group (mean relative abundance of 3.9% vs 2.6%). *D. pigrum* was found at an even higher relative abundance in the anterior nare (10.3% in 12 cochlear implant recipients vs 9.3% in 70 COME patients) (FIG. 7).

Figure 8A:
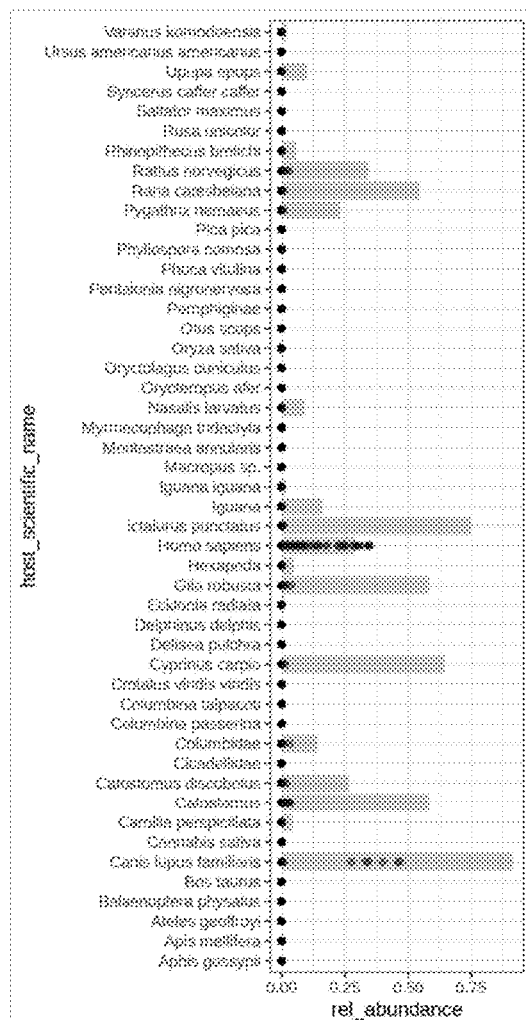
FIG. 8: *Dolosigranulum* in different host species and within different body sites of the human host. A) Presence and relative abundance of *Dolosigranulum* in different host species. Grey bars in the back represent the prevalence. Only species with ten or more samples available are depicted. Dots represent the relative abundances, in case more samples have a similar relative abundance, dots will appear darker. B) Percentage of *Dolosigranulum* in samples from human milk, nasal cavity, oral cavity, skin, stool, and vagina of the shotgun metagenomics datasets, accessed through the curatedMetagenomics R package. C) Comparison of relative abundance of *Dolosigranulum* in the different human body sites under study. Vaginal samples are not shown, as no *Dolosigranulum* was detected in these samples.
Figure 8B:
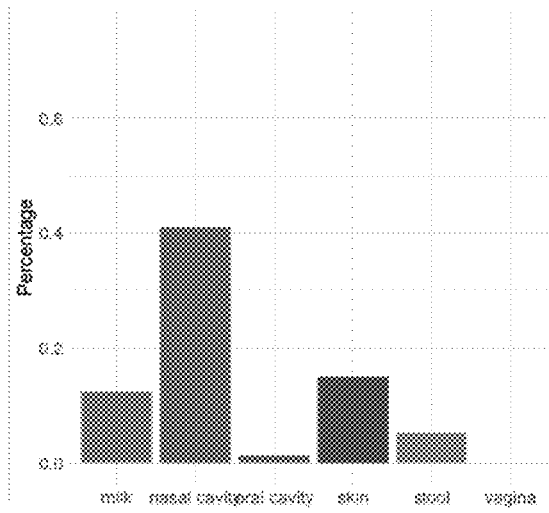
Figure 8C:
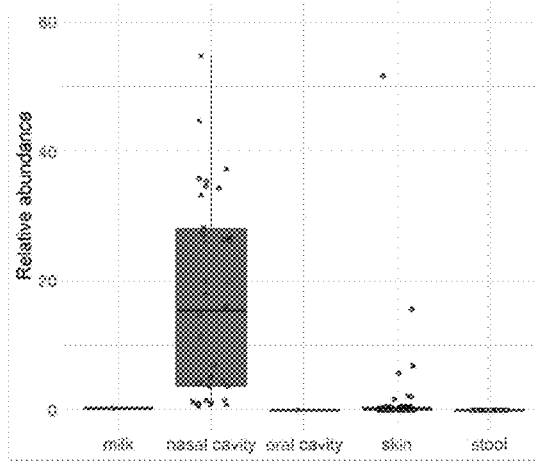

Since *Dolosigranulum* is a rather underexplored bacterial member of the LAB, we aimed to explore its prevalence and relative abundance in different host species (FIG. 8A). *Dolosigranulum* was prevalent, defined here as present, in different host species, such as rodents (*Rattus norvegicus*), fish (*Ictalurus punctatus, Cyprinus carpio, Catostomus*), birds (*Gila robusta*), and primates (*Pygathrix nemaeus, Nasalis larvatus*), but relative abundances were very low (below 1%) FIG. 8A). In humans and dogs (*Canis lupus familiaris*) on the other hand, *Dolosigranulum* was found in high relative abundances up to almost 50% (FIG. 8)). Interestingly, the samples from dogs with high relative abundances were classified as nasal secretions.

As we also observed high relative abundances in the human URT based on our sequencing data, we hypothesized that *Dolosigranulum* might be mainly associated with the respiratory system. This was further investigated by analysing its presence and relative abundance in different habitats of the human body, based on publicly available shotgun sequencing data, available in the curatedMetagenomicData R-package, as described (Pasolli et al., 2017). In total, 7152 samples from six different body sites were included, i.e., nasal cavity (n=93), oral cavity (n=701), skin (n=512), stool (n=6784), vagina (n=86) and human milk (n=8) (FIG. 8B, C)). *Dolosigranulum* was detected in 38 nasal cavity samples (41%), 75 skin samples (15%), one milk sample (12.5%), 36 stool samples (0.53%), one oral cavity sample (0.14%), and was not detected in the vagina. Based on relative abundance however, only the nasal cavity showed high abundances of *Dolosigranulum* (mean relative abundance 17%). This is in accordance with our study, where we found a mean relative abundance of 13% in anterior nares of healthy controls.

Because the results described above indicate that *Dolosigranulum* is mainly associated with the human URT, and because this bacterium has a higher prevalence and relative abundance in our healthy controls sampled, we hypothesized that *Dolosigranulum* might be beneficial for URT health and might have potential as probiotic for the URT. According to the second Koch postulate for probiotics, the microorganisms must be isolated from a healthy organism and grown in pure culture. We therefore aimed to cultivate a *Dolosigranulum* isolate from the healthy URT to explore its probiotic potential. Although high abundances of *Dolosigranulum* can be found in the URT, isolation turned out to be extremely challenging. Members of the Carnobacteriaceae such as *Carnobacterium* are for instance known for their slow growth under the desired laboratory conditions (Afzal et al., 2010), and other common URT bacteria consequently overgrow in the culture medium. In addition, the most suitable growth conditions for *Dolosigranulum* are still not defined, as some strains prefer for instance growth under anaerobic conditions, whereas others require aerobic conditions. Furthermore, the colonies do not stay viable for a long time on agar plates. We were able to isolate one *Dolosigranulum* AMBR11 (or LMG P-31124) isolate (confirmed on 16S rRNA gene level). Even after isolation of this isolate, additional precautions were taken in order to avoid contamination of the bacterial stock due to the slow growth of this strain. DNA was extracted and subjected to whole genome sequencing. The isolated *D. pigrum* AMBR11 (or LMG P-31124) had a genome size of 1.8 Mb and GC content of 39.6%. Pairwise genome comparison matrix ANI (average nucleotide identity) was then used as method to investigate whether *Dolosigranulum* AMBR11 (or LMG P-31124) can be classified as *D. pigrum* at species level. The ANI value of 0.975 between *D. pigrum* LMG15126 and our own isolate confirmed that this isolate is classified as a *D. pigrum*, which is—to the best of our knowledge—up to now the only described species within the *Dolosigranulum* genus. *D. pigrum* AMBR12 was isolated from the anterior nare of a healthy child without a history of otitis media, asthma or respiratory allergies using BHI (Brain Heart Infusion) medium supplemented with 0.5% (v/v) Tween 80 incubated at 37° C. Whole genome sequencing followed by comparison to the *D. pigrum* type strain ATCC 51524 confirmed its identity, with an ANI (Average Nucleotide Identity) value of 0.9748 (EZBioCloud ANI calculator).

Based on their genomes, we further evaluated the presence of antibiotic resistance or virulence and toxin genes, as these are undesired features for any bacterial strain if we want to explore its potential as a probiotic. No virulence genes were identified when using the Virulence Factors Database (VFDB) database. Chromosomal and/or plasmid antibiotic resistance genes were neither present.

Figure 9A:
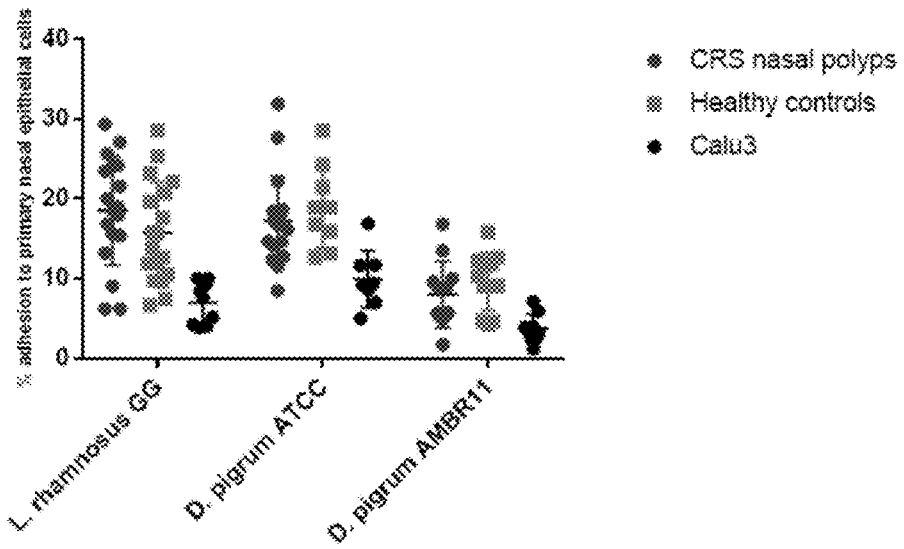
FIG. 9: Adherence assays to investigate adherence capacity of *L. rhamnosus* GG and *D. pigrum* strains (A and B). Isolate AMBR11 is deposited as strain LMG P-31124.
Figure 9B:
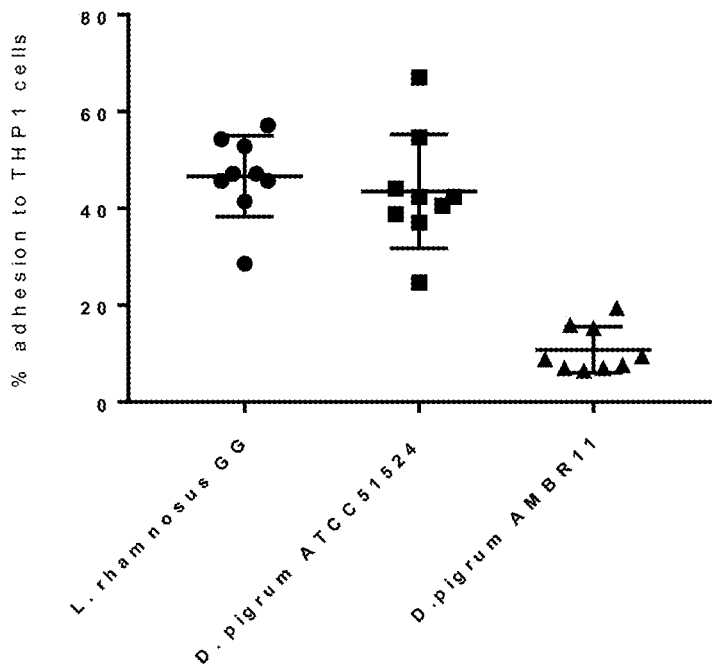
Figure 10A:
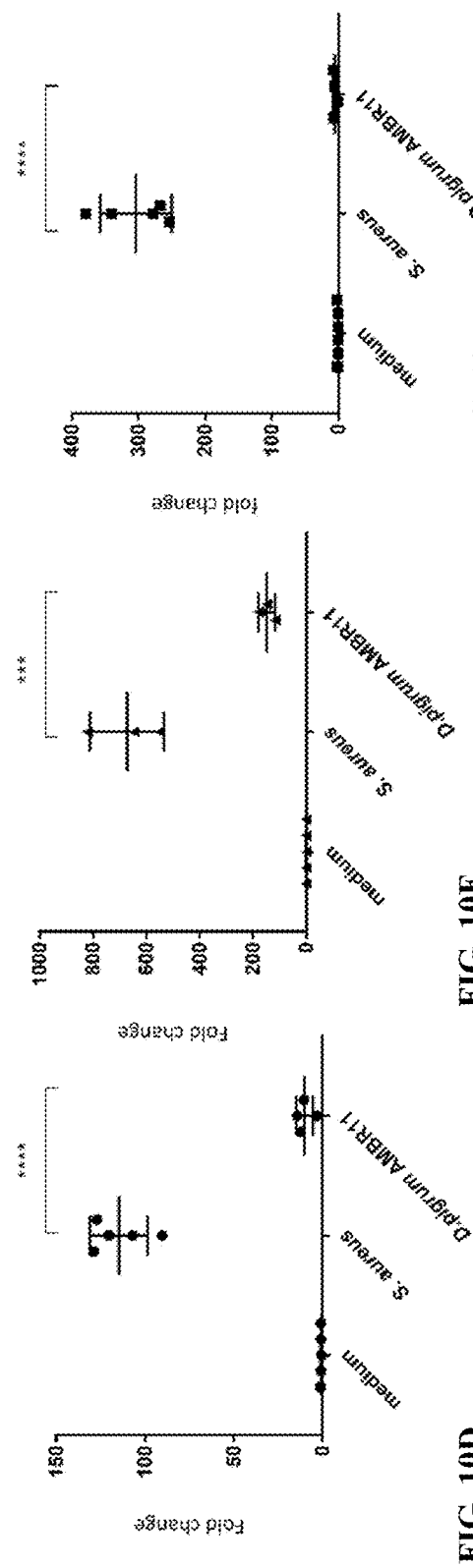
FIG. 10: Safety assessment. Absence of pro-inflammatory interactions of *D. pigrum* in Calu3 cells and barrier-disrupting effects in primary nasal epithelial cells. Induction of IL-8 (A), TNF-α (B) or IL-1β (C) mRNA by *S. aureus* and *D. pigrum* AMBR11 (or LMG P-31124) (or LMG P-31124) in the Calu-3 cells. Bacteria were incubated with the cells for 4 hours in a final concentration of 108 CFU/mL. The presented data are representative of two independent experiments. Data are expressed as means±standard deviations. *p<0.001, **p<0.0001. D) Induction of IL-8 (black) or IL-1β (grey) mRNA by *S. aureus* and *D. pigrum* AMBR11 (or LMG P-31124) in primary NECs from healthy controls (n=5). Bacteria were incubated with the cells for 6 hours in a final concentration of $10^7$ CFU/mL. Data are expressed as means±standard deviations. E) Evaluation of TER to measure epithelial barrier integrity for 6 hours after addition of *D. pigrum* AMBR11 (or LMG P-31124) and *S. aureus* on primary NECs from healthy controls. TEER values are expressed as relative percentages against the initial TER. Bacterial strains were added in a concentration of $10^7$ CFU/mL and TEER was measured every 2 hours. Cells as such (condition referred to as 'medium') were used as negative control. Results are expressed as the mean with standard deviation. fF Evaluation of FD4 passage to measure epithelial barrier integrity for 6 hours after addition of *D. pigrum* AMBR11 (or LMG P-31124) and *S. aureus* on primary NECs from healthy controls. FD4 values are expressed in pmols. Bacterial strains were added in a concentration of $10^7$ CFU/mL and FD4 was measured every 2 hours. Cells as such (condition referred to as 'medium') were used as negative control. Results are expressed as the mean.
Figure 10B:
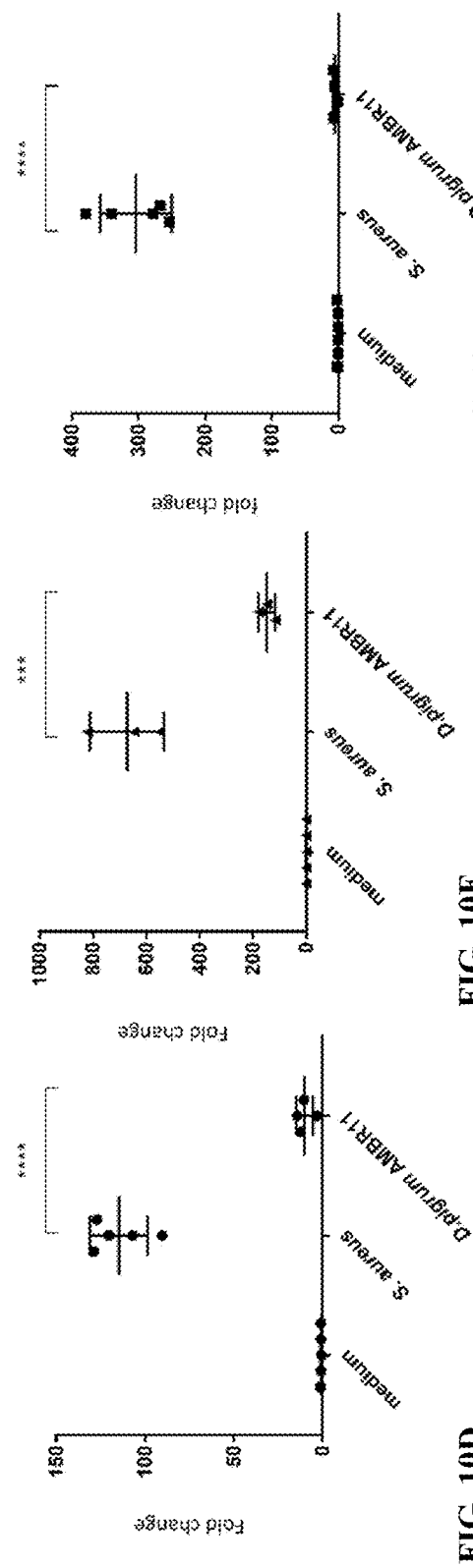
Figure 10C:
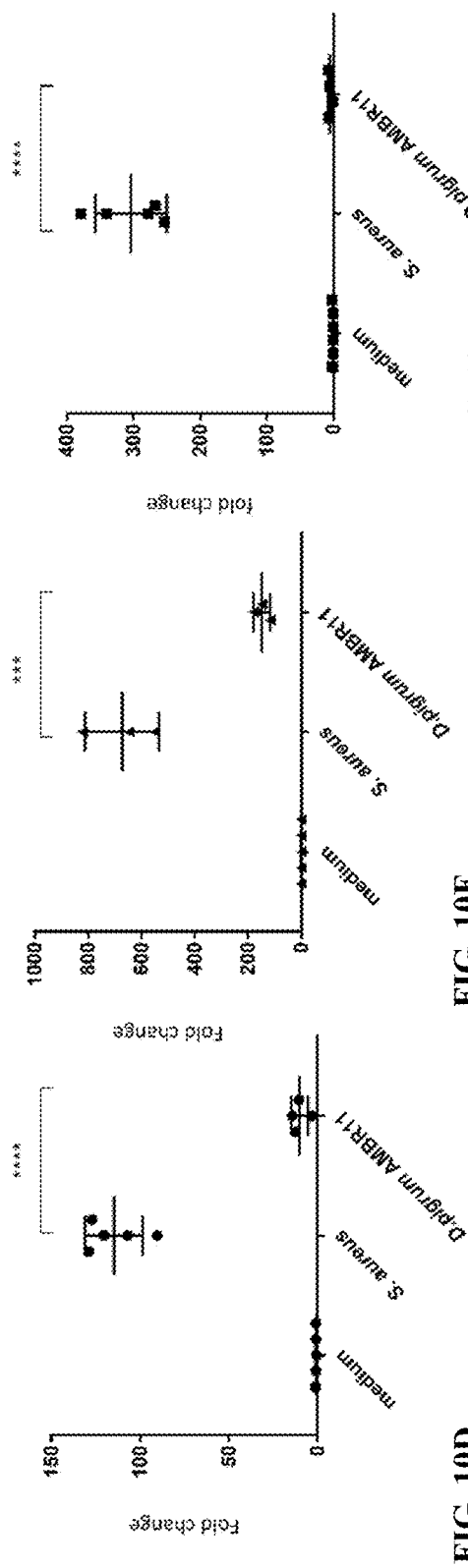
Figure 10D:
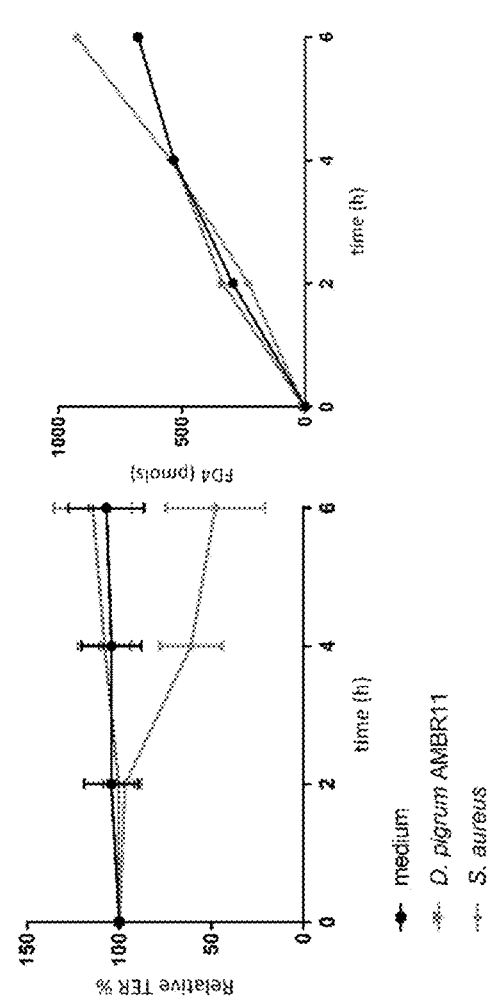
Figure 10E:
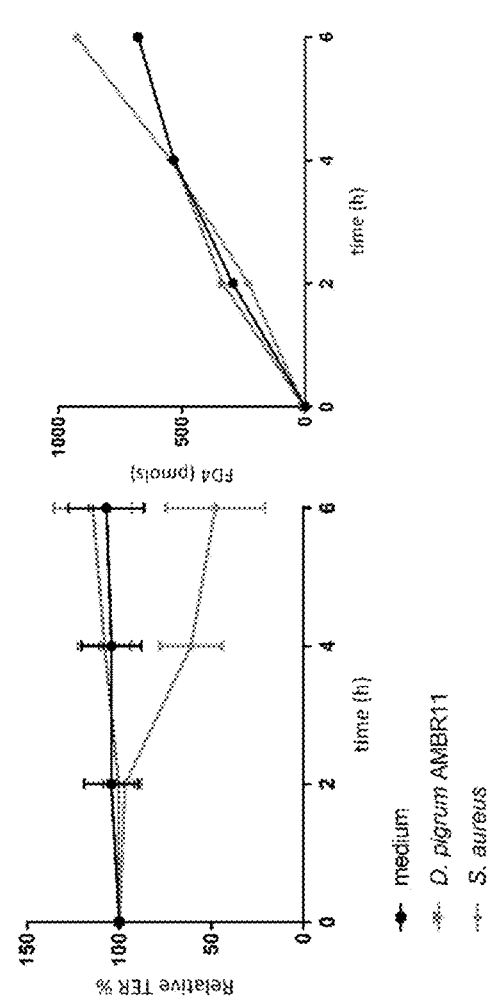
Figure 10F:
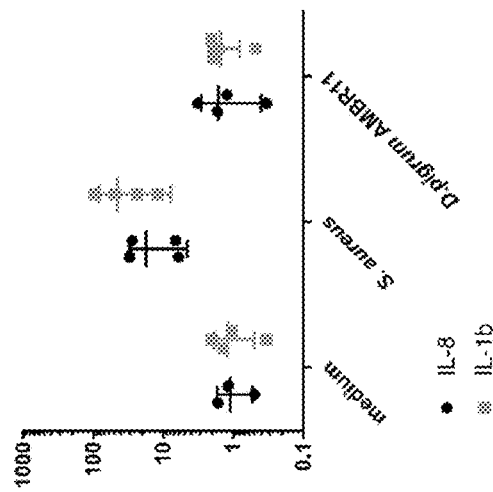

*Dolosigranulum pigrum* AMBR11 (or LMG P-31124) Adherence to Airway Epithelial Cells The *Dolosigranulum* isolate AMBR11 (or LMG P-31124) and the ATCC51524 strain were then phenotypically evaluated and compared to each other, as well as compared to the model probiotic strain *L. rhamnosus* GG. Initially, we screened for the adherence capacity of the strains, since this adherence might be an important first step towards beneficial effects. Adherence was investigated in both airway epithelial cells (Calu-3) and primary nasal epithelial cells of both healthy controls and CRS patients with nasal polyps (FIG. 9). The adherence of all strains was remarkably higher in the primary cells compared to adherence to the Calu-3 cells. *L. rhamnosus* GG and *D. pigrum* ATCC 51524 adhered to the same extent to all cell types, while adherence of *D. pigrum* AMBR11 (or LMG P-31124) was remarkably lower.

We then aimed to investigate whether *Dolosigranulum* expresses pili/fimbriae-like structures that might be involved in adhesion. Scanning electron microscopy (SEM) was performed to investigate the presence of potential pili (data not shown). We observed the presence of the long filamentous SpaCBA pili on the cell surface of *L. rhamnosus* GG.

At the cell surface of both *D. pigrum* ATCC 51524 and *Dolosigranulum* AMBR11 (or LMG P-31124), also filamentous structures were observed, although their structure seems different than the structure of the SpaCBA pili (data.

Safety Assessment

Since URTIs are often associated with overt inflammation, it is important to screen potential probiotic strains so that do not induce over pro-inflammatory responses. Therefore, we tested the expression of the important inflammatory cytokines-IL-1β, TNF and IL-8, upon co-incubation of human cells with the bacteria (FIG. 10A-D). Transepithelial electrical resistance (TEER) and fluorescein isothiocyanate-dextran (FD4) passage were also used as measures for barrier integrity (FIG. 10 E-F). In primary NECs from healthy controls, the tested lactobacilli and *D. pigrum* AMBR11 (or LMG P-31124) did not affect barrier integrity, as TEER values remained stable throughout the six hours incubation period of the cells with bacteria, comparable with the TEER of the cells as such. *S. aureus* on the other hand had a significant effect on barrier integrity, as the mean TEER decreased to 48% after six hours of incubation (FIG. 10 D). The same tendency was observed in NECs from CRSwNP patients. *D. pigrum* and *L. rhamnosus* GG did not seem to influence epithelial barrier integrity compared to cells as such, while *S. aureus* caused a significant decrease, with relative TEER values decreasing to 23%. These results were also reflected based on FD4 passage, where FD4 passage was significantly higher in *S. aureus* conditions, for both NECs from healthy control and CRSwNP patients indicating more barrier disruption (FIG. 10 F).

The induction of the pro-inflammatory cytokines and potential barrier-disrupting effects (measured by TEER analysis and FD4 passage) was compared between model probiotic *L. rhamnosus* GG, both *D. pigrum* strains and the important airway pathobiont *S. aureus*. These experiments showed that our isolate induces the expression of pro-inflammatory cytokines to the same extent as model probiotic strain *L. rhamnosus* GG and the *D. pigrum* ATCC 51524, while *S. aureus* induced the expression significantly more.

Probiotic Effects: Antipathogenic, Barrier Enhancing, and Immunomodulatory Properties We then aimed to investigate the phenotypic potential of *Dolosigranulum pigrum* AMBR11 (or LMG P-31124) related to different probiotic action mechanisms. Since *S. aureus* is considered an important URT pathobiont, antimicrobial activity and immunomodulatory effects of *D. pigrum* AMBR11 (OR LMG P-31124) were focused against *S. aureus*.

Figure 11A:
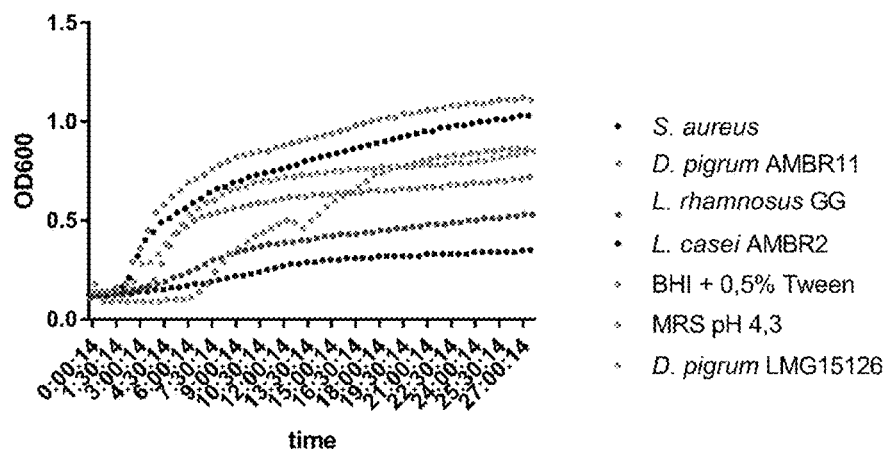
FIG. 11: Antimicrobial effects and lactic acid production of *Lactobacillus* and *Dolosigranulum* species. A) Antimicrobial effects of CFS of *L. rhamnosus* GG, *L. casei* AMBR2, *D. pigrum* LMG15126 and *D. pigrum* AMBR11 (OR LMG P-31124) against *S. aureus* were evaluated over time. Non inoculated MRS brought to pH 4.3 and BHI+0.5% Tween were used as negative control. B) L- and D-lactic acid production by *L. rhamnosus* GG, *L. casei* AMBR2, *D. pigrum* LMG15126, and *D. pigrum* AMBR11 (or LMG P-31124) after overnight incubation.

We started by evaluating the antimicrobial effects of *D. pigrum* AMBR11 (or LMG P-31124) on the growth of *S. aureus* via growth-inhibition assays, hereby using cell-free supernatant (CFS) of *D. pigrum* AMBR11 (or LMG P-31124) in which the potential antimicrobial products are secreted. This CFS was compared with the antimicrobial effects of CFS of *D. pigrum* LMG15126 and the well-described model probiotic *L. rhamnosus* GG and URT isolate *L. casei* AMBR2. The latter is shown to have unique features related to URT-adaptation and might have potential as URT probiotic. The growth of *S. aureus* as such or *S. aureus* supplemented with CFS of the lactobacilli or *Dolosigranulum* was measured over time (FIG. 11A). Interestingly, CFS of all tested lactic acid bacteria was able to partly inhibit the growth of *S. aureus*. However, the inhibitory effects of *D. pigrum* AMBR11 (or LMG P-31124) were less pronounced than the effects of *L. rhamnosus* GG and *L. casei* AMBR2. *D. pigrum* LMG15126 seemed to inhibit the growth of *S. aureus* initially more compared to the own isolate, but after 28 hours the inhibition by *D. pigrum* AMBR11 (or LMG P-31124) was larger compared to the inhibition by *D. pigrum* LMG15126. Non-inoculated MRS medium brought to pH 4.3 was used as negative control for the effects of the lactobacilli, and only induced a small delay in growth of *S. aureus*, indicating a partial pH effect of the *Lactobacillus*-mediated inhibition. Non-inoculated BHI medium supplemented with 0.5% Tween was used as negative control for *Dolosigranulum*, and even slightly promoted growth of *S. aureus*.

Figure 11B:
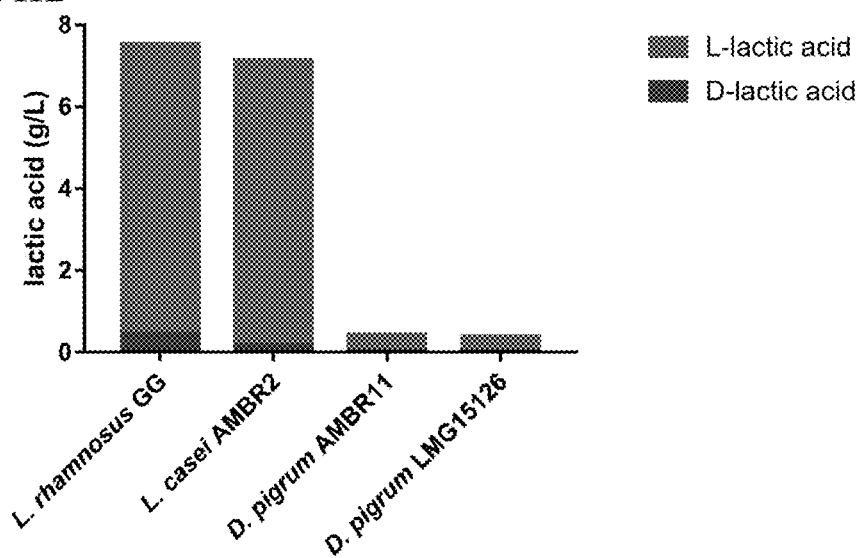

Since lactic acid is known as an important factor in the antimicrobial activity of lactobacilli (van den Broek et al., 2018), we aimed to investigate differences in lactic acid production between the tested lactobacilli and both *D. pigrum* strains after overnight incubation (FIG. 11B). In agreement with belonging to the lactic acid bacteria, *Dolosigranulum* was able to produce L-lactic acid, but significantly less compared to *L. rhamnosus* GG and *L. casei* AMBR2, with concentrations of 7 g/L for both *L. rhamnosus* GG and *L. casei* AMBR2, and 0.41 g/L and 0.37 g/L for *D. pigrum* AMBR11 (OR LMG P-31124) and *D. pigrum* LMG15126, respectively. It should however be taken into account that the growth of *Dolosigranulum* is significantly lower than that of lactobacilli, +/−5×10$^7$ CFU/mL for an overnight culture of *Dolosigranulum* while this is 1×10$^9$ CFU/mL for *Lactobacillus*. This lower amount of lactic acid production might also explain why a less pronounced inhibitory effect on *S. aureus* growth by *D. pigrum* was observed in the growth-inhibition assay.

Figure 12A:
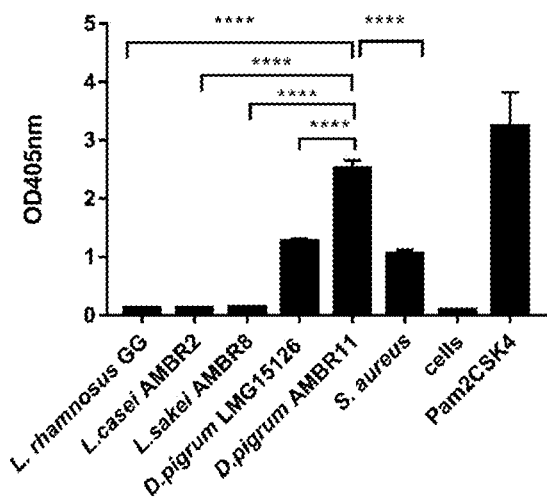
FIG. 12: Immunomodulatory interaction of *D. pigrum* with TLR2/6 and TLR1/2. A) Activation of TLR2/TLR6 by *D. pigrum* strains, *Lactobacillus* strains and *S. aureus*. Pam2CKS4 was used as positive control. Significant differences between *D. pigrum* AMBR11 (orLMG P-31124) with the other tested strains are indicated with an asterisks. ****p<0.0001. B) Activation of TLR2/TLR1 by *D. pigrum* strains, *Lactobacillus* strains and *S. aureus*. Pam3CKS4 was used as positive control. Significant differences between *D. pigrum* AMBR11 (OR LMG P-31124) with the other tested strains are indicated with an asterisks. *p<0.05, ****p<0.0001.
Figure 12B:
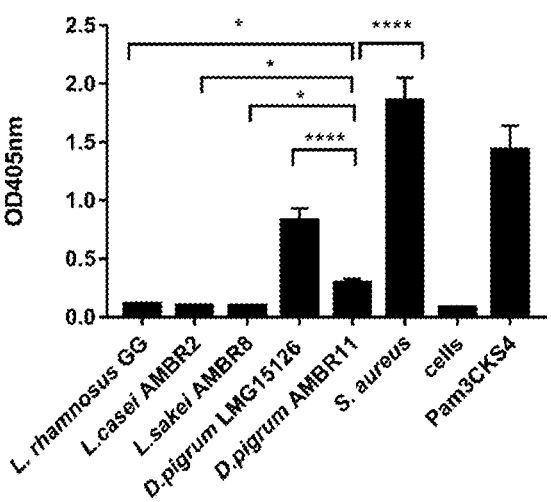

We then explored the capacity of *D. pigrum* to interact with toll-like receptors (TLRs) (FIG. 12). TLR2/6 is an important pathway in barrier-enhancing effects of gut probiotics. Here, we explored the activation of both TLR2/TLR1 and TLR2/TLR6 by *D. pigrum* AMBR11 (OR LMG P-31124) and LMG15126, *L. rhamnosus* GG, *L. casei* AMBR2, *L. sakei* AMBR8 and *S. aureus* in transfected human embryonic kidney (HEK) cells. *D. pigrum* AMBR11 (or LMG P-31124) mainly activated the TLR2/TLR6 heterodimer, which was significantly higher (p<0.0001) compared to all other tested conditions, including *D. pigrum* LMG15126. This is an important action, since many barrier-enhancing effects of bacteria in other mucosal surfaces such as the gut function via TLR2/6. Stimulation of TLR2/TLR1 by *D. pigrum* AMBR11 (OR LMG P-31124) was remarkably lower, although the activation of TLR2/TLR1 by *D. pigrum* AMBR11 (OR LMG P-31124) was still significantly higher compared to the tested lactobacilli (p<0.05), *D. pigrum* LMG15126 and *S. aureus* induced a higher activation of this receptor (p<0.0001). The latter induced the most pronounced activation of TLR2/TLR1. The tested lactobacilli seemed not to induce a strong induction of either TLR2/TLR6 and TLR2/TLR1 (FIG. 12).

Figure 13A:
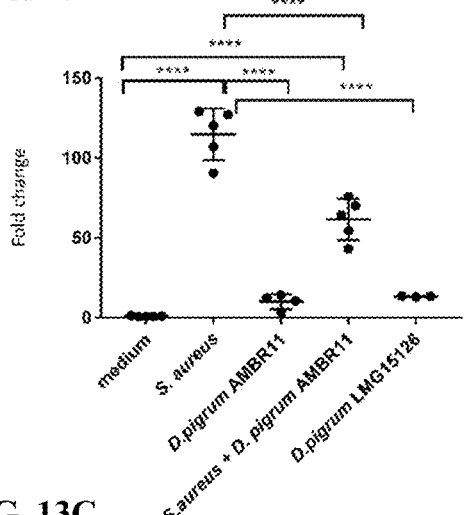
FIG. 13: Antipathogenic activity of *D. pigrum* in cell line model (A-C). and (D) *Galleria mellonela* model. Induction of IL-8 (a), TNF (b), and IL-1β (c) mRNA by *S. aureus*, *D. pigrum* AMBR11 (OR LMG P-31124) and *D. pigrum* LMG15126 alone or when *S. aureus* was co-incubated with URT isolate *D. pigrum* AMBR11 (or LMG P-31124) in the Calu-3 cells. Bacteria were incubated with the cells for 4 hours in a final concentration of $10^8$ CFU/mL. The presented data are representative of two independent experiments. Data are expressed as means±standard deviations. Significant differences are indicated with an asterisks: *p<0.001, **p<0.0001. (D) Survival of *G. mellonella* larvae. Cocultures of *D. pigrum* AMBR11 (or LMG P-31124) with *S. aureus* ATCC29213 were inoculated in the haemolymph of the larvae and survival was studied for 144 hours post-infection (p.i.). Results were compared with monocultures of *S. aureus* in order to investigate whether *D. pigrum* is able to partly inhibit the virulence induced by *S. aureus*.
Figure 13B:
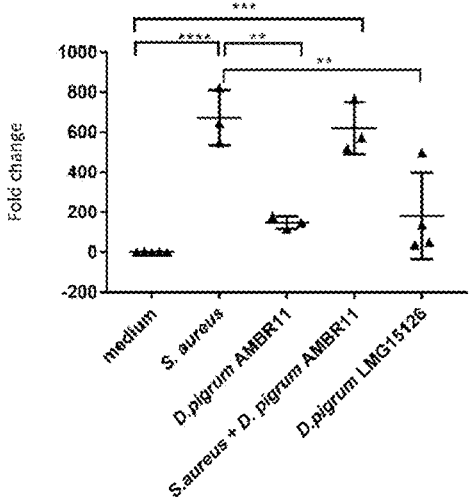
Figure 13C:
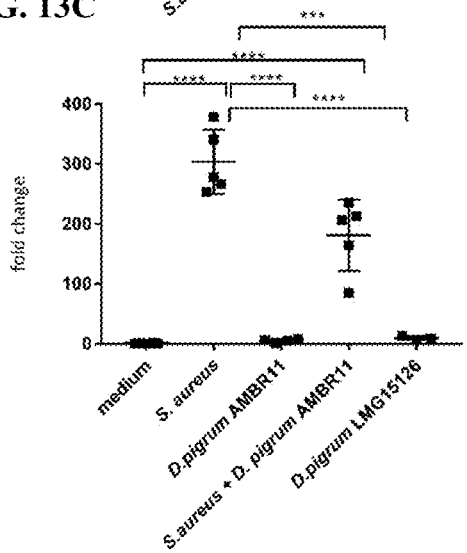
Figure 13D:
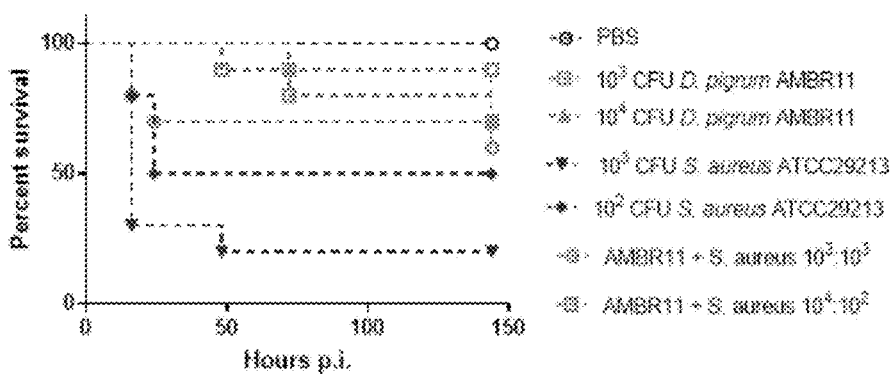

Next to the detrimental effects of *S. aureus* on the epithelial barrier, it is also known that this pathobiont induces a high inflammatory response in airway cells. Therefore, we next aimed to explore the capacity of *Dolosigranulum pigrum* AMBR11 (or LMG P-31124) to reduce the inflammation induced by *S. aureus*. The induction of IL-8, TNF-α, and IL-1β in the Calu-3 cells was evaluated for the bacterial strains in mono- and coculture (FIG. 13A-C). The expression of the pro-inflammatory cytokines was significantly higher by stimulation of the Calu-3 cells with *S. aureus*, compared to *D. pigrum* AMBR11 (OR LMG P-31124) (FIG. 13A-C). The induction of the tested cytokines by *D. pigrum* AMBR11 (OR LMG P-31124) was similar as for *D. pigrum* LMG15126. Of interest, *D. pigrum* AMBR11 (OR LMG P-31124) seemed to exert anti-inflammatory effects on the inflammation induced by *S. aureus*, as the expression of both IL-8 (FIG. 13A) and IL-1β (FIG. 13C) was significantly decreased when *S. aureus* was co-incubated with *D. pigrum* AMBR11 (OR LMG P-31124) compared to the induction of *S. aureus* alone. For TNF-α expression, no significant differences were observed.

Finally, we also aimed to explore whether the observed virulence of *S. aureus* ATCC29213 could be partly inhibited upon co-injection with *D. pigrum* AMBR11 (or LMG P-31124) in *Galleria*. We therefore tested the survival of the larvae after injection of the bacterial cocultures in comparison with injection of *S. aureus* alone. Results are depicted in FIG. 13 D. The survival percentage of the larvae was better when *S. aureus* was injected in coculture with *Dolosigranulum pigrum* AMBR11 (OR LMG P-31124). A tested concentration of $10^3$ CFU *S. aureus* alone gave a survival of 20%, 144 hours post infection, while this was 60% upon when the coculture was injected. For a concentration of 102 CFU *S. aureus*, 50% survived in the monoculture, while this was 70% in coculture with the *Dolosigranulum* isolate. These results confirm are previous results that *Dolosigranulum pigrum* AMBR11 (or LMG P-31124) can have antimicrobial and anti-inflammatory effects against *S. aureus* and is of great interest for its use as potential URT probiotic.

REFERENCES

Afzal M I, Jacquet T, Delaunay S, Borges F, Millière J B, Revol-Junelles A M, Cailliez-Grimal C. *Carnobacterium maltaromaticum*: identification, isolation tools, ecology and technological aspects in dairy products. Food Microbiol. 2010. 27(5):573-9.

Biesbroek G, Tsivtsivadze E, Sanders E a M, Montijn R, Veenhoven R H, Keijser B J F, Bogaert D. Early respiratory microbiota composition determines bacterial succession patterns and respiratory health in children. Am J Respir Crit Care Med 2014; 190:1283-1292.

De Boeck I, Wittouck S, Wuyts S, Oerlemans E F M, van den Broek M F L, Vandenheuvel D, Vanderveken O, Lebeer S. Comparing the Healthy Nose and Nasopharynx Microbiota Reveals Continuity As Well As Niche-Specificity. Front Microbiol 2017; 8:2372.

De Boeck I, Wittouck S, Martens K, Claes J, Jorissen M, Steelant B, van den Broek M F L, Seys S F, Hellings P W, Vanderveken O M, Lebeer S. Anterior nares diversity and pathobionts represent sinus microbiome in chronic rhinosinusitis. mSphere. 2019 4(6). pii: e00532-19.

Callahan B J, Mcmurdie P J, Rosen M J, Han A W, Johnson A J, Holmes S P. DADA2: High-resolution sample inference from Illumina amplicon data. Nat Methods 2016; 13:581.

Chalermwatanachai T, Vilchez-Vargas R, Holtappels G, Lacoere T, Jáuregui R, Kerckhof F M, Pieper D H, Van De Wiele T, Vaneechoutte M, Van Zele T, Bachert C. Chronic rhinosinusitis with nasal polyps is characterized by dysbacteriosis of the nasal microbiota. Sci Rep 2018; 8:1-13.

Koeller K, Herlemann D P R, Schuldt T, Ovari A, Guder E, Collin M. Microbiome and Culture Based Analysis of Chronic Rhinosinusitis Compared to Healthy Sinus Mucosa. Front Microbiol 2018; 9:1-12.

Laufer A S, Metlay J P, Gent J F, Fennie K P, Kong Y, Pettigrew M M. Microbial communities of the upper respiratory tract and otitis media in children. MBio 2011; 2:e00245-10.

Lebeer S, Claes I, Tytgat H L, Verhoeven T L, Marien E, von Ossowski I, Reunanen J, Palva A, Vos W M, Keersmaecker S C, Vanderleyden J. Functional analysis of *Lactobacillus rhamnosus* G G pili in relation to adhesion and immunomodulatory interactions with intestinal epithelial cells. Appl Environ Microbiol. 2012 78(1):185-93.

Mahdavinia M, Engen P A, LoSavio P S, Naqib A, Khan R J, Tobin M C, Mehta A, Kota R, Preite N Z, Codispoti C D, Tajudeen B A, Schleimer R P, Green S J, Keshavarzian A, Batra P S. The nasal microbiome in patients with chronic rhinosinusitis: Analyzing the effects of atopy and bacterial functional pathways in 111 patients. J Allergy Clin Immunol 2018; 142:287-290.e4

Pasolli E, Schiffer L, Manghi P, Renson A, Obenchain V, Truong D T, Beghini F, Malik F, Ramos M, Dowd J B, Huttenhower C, Morgan M, Segata N, Waldron L. Accessible, curated metagenomic data through ExperimentHub. Nat Methods. 2017 14(11):1023-1024.

Ramakrishnan V R, Hauser L J, Feazel L M, Ir D, Robertson C E, Frank D N. Sinus microbiota varies among chronic rhinosinusitis phenotypes and predicts surgical outcome. J Allergy Clin Immunol 2015; 136:1-10.

Vandeputte D, Kathagen G, D'hoe K, Vieira-Silva S, Valles-Colomer M, Sabino J, Wang J, Tito R Y, De Commer L, Darzi Y, Vermeire S, Falony G, Raes J. Quantitative microbiome profiling links gut community variation to microbial load. Nature. 2017 551(7681):507-511 van den Broek M F L, De Boeck I, Claes I J J, Nizet V, Lebeer S. Multifactorial inhibition of lactobacilli against the respiratory tract pathogen *Moraxella catarrhalis*. Benef Microbes. 2018 9(3):429-439

---

The invention claimed is:

1. A method for improving or restoring the flora and/or microbiota of the respiratory tract and skin of a subject, the method comprising administering to the subject a composition comprising an isolated bacterial strain of a *Dolosigranulum pigrum* species, wherein the isolated bacterial strain is the strain deposited under accession number LMG P-31124.

2. The method according to claim 1, wherein the subject is a human or an animal.

3. A method of treating a disease selected from the group consisting of disorders of the oronasopharyngeal cavity and skin infections with *Staphylococcus aureus* in a subject, the method comprising administering to the subject a composition comprising an isolated bacterial strain of a *Dolosigranulum pigrum* species wherein the isolated bacterial strain is the strain deposited under accession number LMG P-31124, wherein the disorder of the oronasopharyngeal cavity is selected from the group consisting of acute and chronic (rhino)sinusitis, acute and chronic otitis media, allergic rhinitis, and allergic sinusitis.

4. The method according to claim 1, wherein the isolated bacterial strain is cultivated (i) in liquid brain heart infusion (BHI), and/or (ii) on tryptic soy agar.

5. The method according to claim 4, wherein the subject is a human or an animal.

6. The method according to claim 1, wherein the composition is administered as a probiotic and/or to improve or restore microbiota of the subject's respiratory tract.

* * * * *